(12) United States Patent
Oren et al.

(10) Patent No.: US 10,712,196 B2
(45) Date of Patent: Jul. 14, 2020

(54) AEROSPACE VEHICLE WEIGHT AND BALANCE ESTIMATION SYSTEM AND METHOD

(71) Applicant: ELBIT SYSTEMS LTD., Haifa (IL)

(72) Inventors: Shachar Oren, Haifa (IL); Jonathan Balter, Haifa (IL); Meir Ben Ari, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 16/091,488

(22) PCT Filed: Mar. 23, 2017

(86) PCT No.: PCT/IL2017/050364
§ 371 (c)(1),
(2) Date: Oct. 4, 2018

(87) PCT Pub. No.: WO2017/175212
PCT Pub. Date: Oct. 12, 2017

(65) Prior Publication Data
US 2019/0120684 A1    Apr. 25, 2019

(30) Foreign Application Priority Data

Apr. 4, 2016 (IL) .......................................... 244904

(51) Int. Cl.
*G01G 19/12* (2006.01)
*G01G 19/07* (2006.01)
(Continued)

(52) U.S. Cl.
CPC ............. *G01G 19/12* (2013.01); *G01G 3/125* (2013.01); *G01G 19/07* (2013.01); *G01G 23/48* (2013.01); *G01L 1/246* (2013.01); *G01M 1/125* (2013.01)

(58) Field of Classification Search
CPC ........ G01G 19/12; G01G 3/125; G01G 19/07; G01G 23/48; G01L 1/246; G01M 1/125
(Continued)

(56) References Cited

U.S. PATENT DOCUMENTS 3,797,302 A * 3/1974 Laimins ................... G01G 3/12
177/211
6,415,242 B1 * 7/2002 Weldon, Jr. ............ G01G 19/07
702/101
(Continued)

FOREIGN PATENT DOCUMENTS

GB        1252143 A    11/1971
IL        244904       4/2016
(Continued)

OTHER PUBLICATIONS

International Search Report dated Jul. 25, 2017 for International Application No. PCT/IL2017/050364, 3 pages.
(Continued)

*Primary Examiner* — Natalie Huls
*Assistant Examiner* — Monica S Young
(74) *Attorney, Agent, or Firm* — Knobbe, Martens, Olson & Bear, LLP

(57) ABSTRACT

A weight estimation system for estimating weight of an aerospace vehicle while grounded, the weight estimation system comprising a measurement subsystem including at least one sensor configured to measure a physical property in an interface that interfaces at least one of a fuselage and a wing with an undercarriage of said aerospace vehicle, in at least one area exhibiting a measurable change in geometry that is at least partly due to said weight, said measurement subsystem configured to produce measured data indicative of said weight of said aerospace vehicle; and a processor for receiving at least part of said measured data, said processor (Continued)

configured to estimate said weight, by relating said measured data with predetermined physical-property-to-weight correspondence data associated with said aerospace vehicle.

21 Claims, 11 Drawing Sheets

(51) Int. Cl.
    *G01G 3/12*     (2006.01)
    *G01G 23/48*     (2006.01)
    *G01L 1/24*     (2006.01)
    *G01M 1/12*     (2006.01)

(58) Field of Classification Search
    USPC .......................................................... 177/1
    See application file for complete search history.

(56) References Cited

U.S. PATENT DOCUMENTS

| | | | |
|---|---|---|---|
| 7,945,422 B2* | 5/2011 | Vetsch | G01G 19/07 701/29.1 |
| 7,983,854 B2* | 7/2011 | O'Brien | B64C 25/00 356/33 |
| 8,060,296 B2* | 11/2011 | Vetsch | G01M 1/125 340/967 |
| 8,235,236 B2 | 8/2012 | Zuares et al. | |
| 8,452,525 B2* | 5/2013 | Sendlinger | G01M 1/125 244/108 |
| 9,064,357 B1* | 6/2015 | McCormick | G05D 15/01 |
| 10,082,420 B2* | 9/2018 | Morris | G01G 19/07 |
| 2008/0011091 A1* | 1/2008 | Weldon, Jr. | G01L 1/255 73/766 |
| 2008/0119967 A1* | 5/2008 | Long | G01G 19/07 701/3 |
| 2009/0026313 A1* | 1/2009 | Briancourt | B64C 25/00 244/100 R |
| 2009/0265120 A1* | 10/2009 | O'Brien | B64C 25/00 702/42 |
| 2011/0313614 A1* | 12/2011 | Hinnant, Jr. | G01M 5/0041 701/33.9 |
| 2015/0100227 A1* | 4/2015 | Nance | G01M 1/125 701/124 |
| 2015/0316438 A1* | 11/2015 | Nance | G01M 1/125 701/3 |
| 2015/0330847 A1* | 11/2015 | McNeilly | G01L 1/246 73/800 |
| 2016/0011073 A1* | 1/2016 | Long | G01M 5/0016 701/34.4 |
| 2016/0195447 A1* | 7/2016 | Nance | G01M 1/125 701/124 |
| 2017/0116617 A1* | 4/2017 | Nance | G01G 19/07 |
| 2017/0168021 A1* | 6/2017 | Van Tooren | G01N 29/041 |
| 2018/0188102 A1* | 7/2018 | Nance | G01G 19/07 |
| 2019/0049287 A1* | 2/2019 | Nance | G01G 19/414 |

FOREIGN PATENT DOCUMENTS

| | | |
|---|---|---|
| RU | 2400405 C1 | 9/2010 |
| WO | 2015/088967 A1 | 6/2015 |

OTHER PUBLICATIONS

Written Opinion of the International Searching Authority dated Jul. 25, 2017 for International Application No. PCT/IL2017/050364, 4 pages.

Edgar A. Mendoza et al. "Light weight, high-speed, and self-powered wireless fiber optic sensor (WiFOS™) structural health monitor system for avionics and aerospace environments", Proc. SPIE 9202, Photonics Applications for Aviation, Aerospace, Commercial, and Harsh Environments V, 92020L (Sep. 17, 2014); doi:10.1117/12.2064343 Proc. SPIE 9202, Photonics Applications for Aviation, Aerospace, Commercial, and Harsh Environments V, 92020L (Sep. 17, 2014); doi:10.1117/12.2064343.

M. Frovel et al. 'Load and usage monitoring of inta unmanned air vehicles', 16th European Conference on Composite Materials, ECCM 2014 https://www.researchgate.net/ publication/290533928_ Load_and_usage_monitoring_of_inta_unmanned_air_vehicles.

Osher Shapira et al. 'Implementation of a fiber-optic sensing technology for global structural integrity monitoring of UAVs', 54th Israel Annual Conference on Aerospace Sciences 2014 vol. 3, 2014, pp. 1833-1839.

M. Frovel et al. "Structural loads monitoring of an unmanned air vehicle", Fifth European Workshop on Structural Health Monitoring 2010; p. 382-387.

A. Japie van Wyk et al. 'A systems engineering approach to structural health monitoring of composites using embedded optical fiber Bragg sensors for aeronautical applications' Proceedings of SPIE—The International Society for Optical Engineering 8066 May 2011 https://www.spiedigitallibrary.org/conference-proceedings-of-spie/8066/1/A-systems-engineering-approach-to-structural-health-monitoring-of-composites/10.1117/12.887318.short?SSO=1.

K. Chandler et al. 'On-line structural health and fire monitoring of a composite personal aircraft using an FBG sensing system' SPIE Proceedings | vol. 6933 Fiber Optic Sensors in Energy https://www.spiedigitallibrary.org/conference-proceedings-of-spie/6933/1/On-line-structural-health-and-fire-monitoring-of-a-composite/10.1117/12.783125.short.

Jin-Hyuk Kim et al 'Application of fiber Bragg grating sensors in light aircraft: ground and flight test', SPIE Proceedings | vol. 9157 | Posters III https://www.spiedigitallibrary.org/conference-proceedings-of-spie/9157/1/Application-of-fiber-Bragg-grating-sensors-in-light-aircraft/10.1117/12.2053641.short.

Nitesh Gupta et al 'Structural health monitoring of composite aircraft structures using fiber bragg grating sensors' Journal of the Indian Institute of Science, 93 (4). pp. 735-750. ISSN 0970-4140.

Thomas Owens et al .'Fiber optic strain monitor for an uninhabited aerial vehicle', Proc. SPIE 6176, Nondestructive Evaluation and Health Monitoring of Aerospace Materials, Composites, and Civil Infrastructure V, 61761G (Mar. 20, 2006); doi:10.1117/12.658778 https://www.spiedigitallibrary.org/conference-proceedings-of-spie/6176/1/Fiber-optic-strain-monitor-for-an-uninhabited-aerial-vehicle/10.1117/12.658778.short.

'On-board weight and balance application', Society of Allied Weight Engineers—66th Annual International Conference on Mass Properties Engineering 2007—Paper No. 1086 https://www.sawe.org/papers/3408.

G.W.H. van Es , "Analysis of aircraft weight and balance related safety Occurrences", National Aerospace Laboratory NLR, May 2007.

* cited by examiner

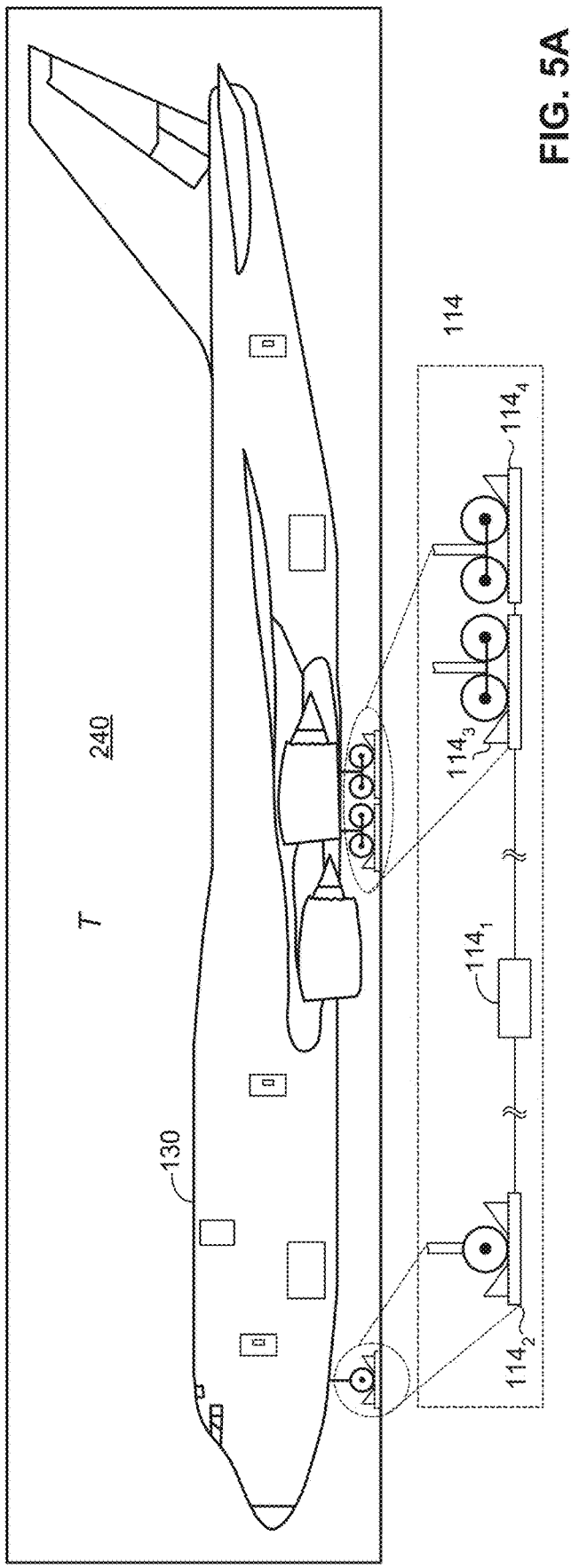
FIG. 5A
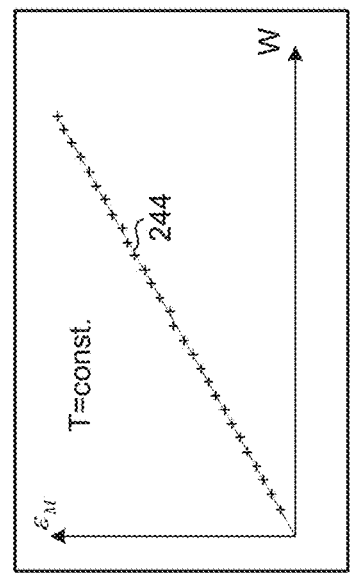
FIG. 5D
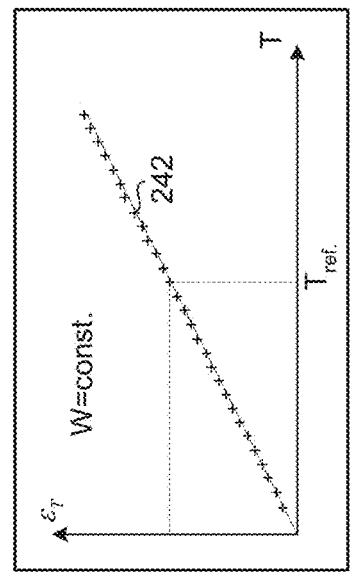
FIG. 5C
FIG. 5B

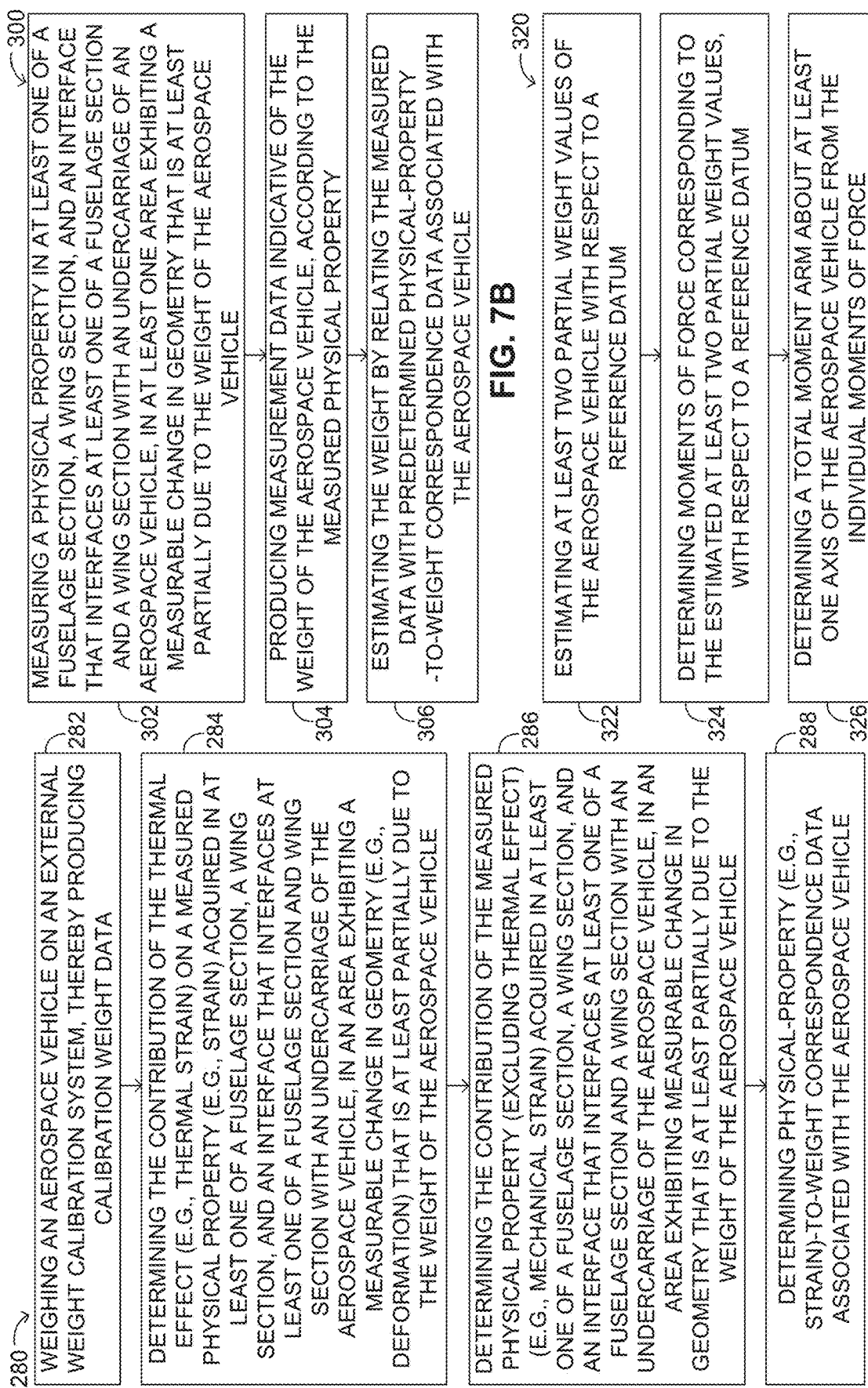

AEROSPACE VEHICLE WEIGHT AND BALANCE ESTIMATION SYSTEM AND METHOD

CROSS REFERENCE TO RELATED APPLICATIONS

This application the U.S. National Phase Application under 35 U.S.C. § 371 of International Application No. PCT/IL2017/050364, filed Mar. 23, 2017, which claims priority to Israeli Application No. IL244904, filed on Apr. 4, 2016, the entire disclosure of each of which is hereby incorporated by reference.

FIELD OF THE DISCLOSED TECHNIQUE

The disclosed technique relates to aerospace vehicles in general, and to systems and methods for estimating weight and balance of aerospace vehicles, in particular.

BACKGROUND OF THE DISCLOSED TECHNIQUE

Knowledge of the weight of an aircraft is crucial for its operation, and safety. Knowledge of the weight allows the calculation of the maximum payload that can be transported a known distance and the amount of fuel required. Knowledge of the point of balance or center of gravity (CG) of an aircraft is also important. For example, if the longitudinal CG is located too forward, the aircraft will be nose heavy, if located too aft, tail heavy. A tail heavy aircraft that deviates from the recommended tolerances may become hazardously unstable exhibiting uncharacteristic spin and stall characteristics. Prior art methods for determining the weight of an aircraft include the use of aviation scales, and weighing sensors located in the landing gear, particularly in the main and nose wheels axles. Each of these prior art methods has its own disadvantages. The main function of the landing gear is not only to support the weight of the aircraft on the ground, but also to at least partly dissipate the tremendous amount of energy produced during the landing impact. Weighing sensors located in the landing gear, and especially the wheel axles are affected by changing conditions that include mechanical factors (e.g., damping pressure, tire pressure, vertical elasticity of the tire, material fatigue, etc.), environmental factors (e.g., temperature, humidity, corrosion, contaminants, etc.), variability in periodic maintenance and service, and the like. Hence, these regular changing conditions may hamper the reliability, accuracy, and efficacy of weight assessment.

The relationship between weight and balance of an aircraft and its safety is recognized and documented. For example, an article entitled "Analysis of aircraft weight and balance related safety occurrences" published by the National Aerospace Laboratory (NLR) of the Netherlands, studies weight and balance related incidents (including accidents) of passenger as well as cargo aircraft. This study concludes that the accuracy and reliability of (then-known) prior art weight and balance systems are insufficient to impose their use as a primary means for determining aircraft weight and balance.

U.S. Pat. No. 8,235,326 B2, issued to Braincourt et al. and entitled "Aircraft Landing Gear Load Sensor" is directed at a fiber optic load sensing system and method for measuring load in an aircraft landing gear. The fiber optical load sensing system includes a plurality of Bragg Grating sensors written into a fiber optic cable, and an interrogator. The fiber optic cable is mounted, such that it is firmly clamped or bonded to the inside of an axle (right and/or left) of an aircraft landing gear. When the axle deflects under vertical and/or drag load, the optical fiber bends in sympathy. The interrogator determines the change in radius of the optical fiber caused by the bending. The change in geometry of the optical fiber is equated to the load that caused the deflection. A remote control and a recorder unit record the output of the fiber optic load sensing system. A plurality of load sensing measurements is taken corresponding to each wheel location such that the load apportionment and total load can be established for a wheel group of the aircraft.

PCT International Publication Number WO 2015/088967 A1 to Moog Inc., entitled "Fiber Optic Sensing and Control System" is directed at a fiber optic sensing aeronautical flight control system for air and space vehicles. The fiber optic sensing and control system includes sensing optical fibers, and an interrogator unit. The sensing optical fibers each include multiple fiber optic sensing points that are integrated or coupled to primary and secondary flight control surfaces of the aircraft. The so-called primary flight control surfaces of the aircraft (airlerons, elevators, and rudder) are used to control aircraft movement in the pitch, yaw, and roll axes, whereas the so-called secondary flight control surfaces (inboard and outboard spoilers, inbound and outbound flaps, flaperons, and slats), are used to influence the lift or drag of the aircraft. The optical fibers are connected to the interrogator unit. The flight surfaces of the aircraft exhibit aeroelastic effects as well as structural loads, as gusts of wind and other forces are applied thereto. The sensing optical fibers sense and measure deformations and oscillations caused by the structural loads. The interrogator interrogates the sensing optical fibers. A flight control computer of the aircraft analyzes the measurements, the analyzed results of which are then fed back to an actuator that controls its corresponding flight control surface.

SUMMARY OF THE PRESENT DISCLOSED TECHNIQUE

It is an object of the disclosed technique to provide a novel method and system for estimating weight of an aerospace vehicle. In accordance with the disclosed technique, there is thus provided a weight estimation system for estimating weight of an aerospace vehicle while grounded. The weight estimation system includes a measurement subsystem and a processor. The measurement subsystem includes at least one sensor configured to measure a physical property (e.g., strain) in at least one of a fuselage, a wing, and an interface that interfaces at least one of the fuselage and the wing with an undercarriage of the aerospace vehicle, in at least one area exhibiting a measurable change in geometry (e.g., deformation) that is at least partly due to the weight. The measurement subsystem is configured to produce measured data indicative of the weight of the aerospace vehicle. The processor is configured for receiving at least part of the measured data and further configured to estimate the weight, by relating the measured data with predetermined physical-property-to-weight correspondence data associated with the aerospace vehicle.

In accordance with the disclosed technique, there is further provided a method for estimating weight of an aerospace vehicle while grounded, the method includes the procedures of measuring a physical property in at least one of a fuselage, a wing, and an interface that interfaces at least one of the fuselage and the wing with an undercarriage of the aerospace vehicle, in at least one area exhibiting a measurable change in geometry that is at least partly due to the weight; producing measured data indicative of the weight of the aerospace vehicle, according to measured physical property; and estimating the weight by relating the measured data with predetermined physical-property-to-weight correspondence data associated with the aerospace vehicle.

In accordance with the disclosed technique, there is further provided a sensor system for an aerospace vehicle. The sensor system includes at least one sensor coupled with at least one of a fuselage, a wing, and an interface that interfaces at least one of the fuselage and the wing with an undercarriage of the aerospace vehicle. The at least one sensor is configured to measure a physical property in at least one of the fuselage, the wing, and the interface, in at least one area exhibiting a measurable change in geometry that is at least partly due to the weight of the aerospace vehicle while grounded. The at least one sensor is further configured to produce measured data indicative of the weight of said aerospace vehicle.

BRIEF DESCRIPTION OF THE DRAWINGS

The disclosed technique will be understood and appreciated more fully from the following detailed description taken in conjunction with the drawings in which:

FIG. 5A is a schematic diagram showing a representative vehicle weight data acquirement technique in a vehicle-specific calibration method, constructed and operative in accordance with the embodiment of the disclosed technique;

FIG. 5B is a schematic diagram showing a calibration graph of the thermal strain as a function of temperature, under a constant weight of aerospace vehicle;

FIG. 5C is a schematic diagram showing a calibration graph of the mechanical strain as a function of weight of the aerospace vehicle being under constant temperature;

FIG. 5D is a schematic diagram showing exemplary vehicle-specific strain-to-weight correspondence data, constructed through the vehicle-specific calibration method, in accordance with the embodiment of the disclosed technique;

FIG. 7A is a schematic block diagram of a preliminary physical-property-to-weight calibration method, constructed and operative in accordance with the embodiment of the disclosed technique;

FIG. 7B is a schematic block diagram of a method for estimating weight of an aerospace vehicle, constructed and operative in accordance with the embodiment of the disclosed technique;

FIG. 7C is a schematic block diagram of a method for estimating balance of the aerospace vehicle, constructed and operative in accordance with the embodiment of the disclosed technique;

DETAILED DESCRIPTION OF THE EMBODIMENTS

Figure 1:
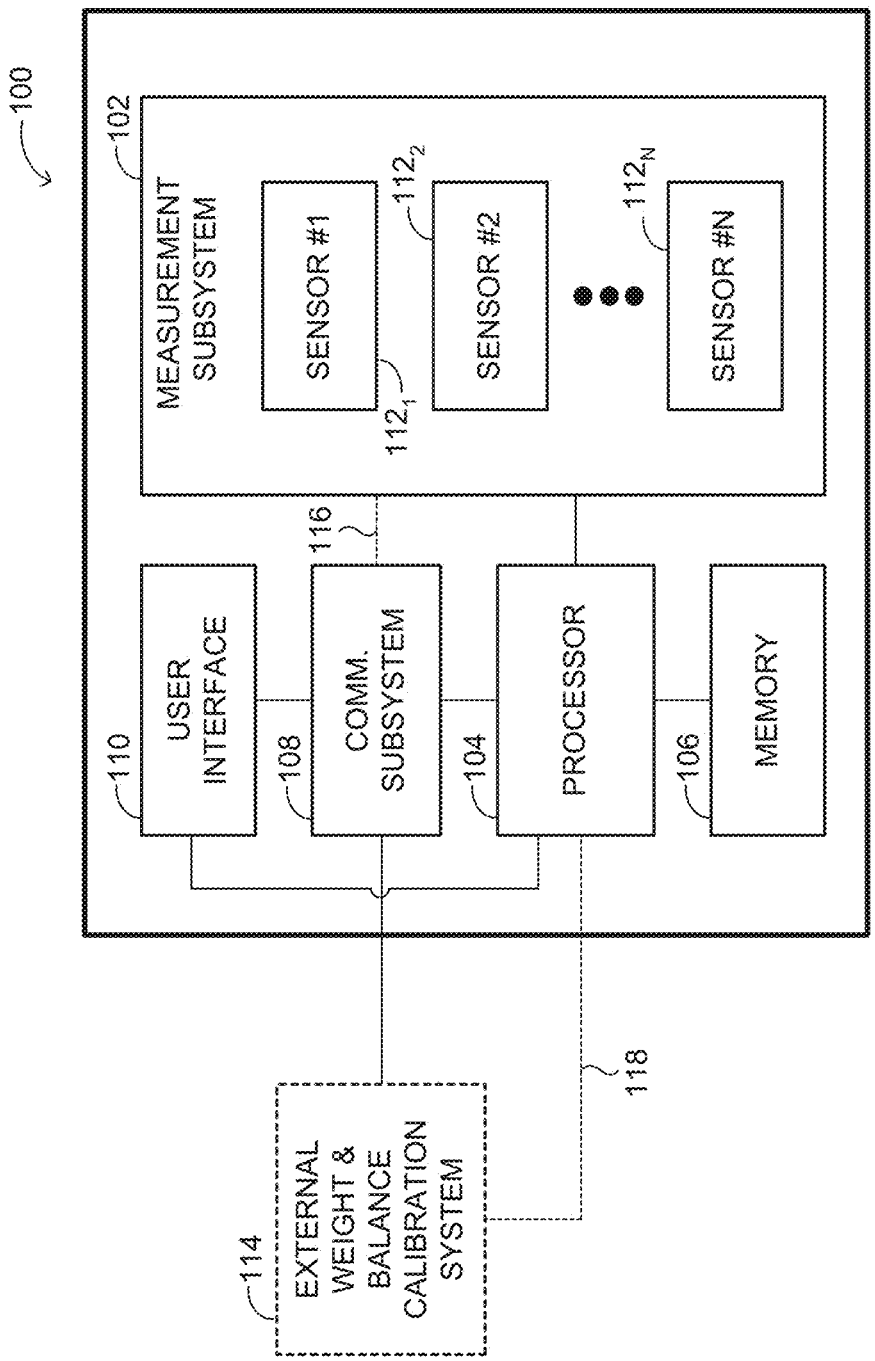
FIG. 1 is a schematic block diagram illustrating a weight and balance estimation system, constructed and operative in accordance with an embodiment of the disclosed technique.

The disclosed technique overcomes the disadvantages of the prior art by providing a weight estimation system and method for estimating the weight of an aerospace vehicle while grounded. The weight estimation system includes a measurement subsystem, and a processor. The measurement subsystem includes at least one sensor (e.g., a strain sensor, pressure sensor, etc.) configured to determine a physical property (e.g., strain, pressure) in at least one of a fuselage (e.g., a fuselage section), a wing (e.g., a wing section), and an interface that interfaces at least one of the fuselage and the wing with an undercarriage (landing gear) of the aerospace vehicle, in at least one area exhibiting a measurable change in geometry (e.g., deformation, displacement, configuration, surface shape) that is at least partly due to the weight of the aerospace vehicle. The measurement subsystem is configured to produce measured data indicative of the weight of the aerospace vehicle. The processor is configured and operative to receive at least part of the measured data and to estimate the weight, by relating the measured data with predetermined physical-property-to-weight (e.g., strain-to-weight) correspondence data associated with the aerospace vehicle. The method for estimating weight of the aerospace vehicle while grounded includes the steps of determining a physical property (e.g., strain, pressure) in at least one of a fuselage, a wing, and an interface that interfaces at least one of the fuselage and the wing with an undercarriage of the aerospace vehicle, in at least one area exhibiting a measurable change in geometry (e.g., deformation, displacement) that is at least partly due to the weight, producing measured data indicative of the weight of the aerospace vehicle, according to the measured physical property (e.g., strain), and estimating the weight by relating the measured data with predetermined physical-property-to-weight (e.g., strain-to-weight) correspondence (e.g., calibration) data associated with the aerospace vehicle. In other words, for each aerospace vehicle whose weight is to be determined by the weight and balance estimation system, there corresponds respective physical-property-to-weight (e.g., strain-to-weight) correspondence data that was predetermined in a preliminary calibration phase.

The disclosed technique further discloses, in the context of a system, a sensor system (e.g., the measurement subsystem) for an aerospace vehicle (for acquiring measurements for estimating weight of the aerospace vehicle). The sensor system (i.e., which is onboard the aerospace vehicle) includes at least one sensor coupled with at least one of a fuselage, a wing, and an interface that interfaces at least one of the fuselage and the wing with an undercarriage of the aerospace vehicle. The at least one sensor is configured to measure a physical property (such as strain, pressure) in at least one of the fuselage, the wing, and the interface, in at least one area exhibiting a measurable change in geometry (such as deformation) that is at least partly due (typically predominately) to the weight of the aerospace vehicle while grounded. The at least one sensor is configured to produce measured data indicative of the weight of the aerospace vehicle. The produced measured data is transmitted to a processor (i.e., which can be onboard, off-board the aerospace vehicle, or embodied partly onboard and partly off-board). The processor is configured to receive the measured data, and to estimate the weight of the aerospace vehicle by relating the received measured data with predetermined physical-property-to-weight (e.g., strain-to-weight) correspondence (e.g., calibration) data associated with the aerospace vehicle.

The term "aerospace vehicle" used herein refers to a vehicle that is designed, intended or capable of travel (e.g., flying, traversing a distance) in at least one of: (1) a fluid (e.g., typically gaseous) atmosphere (e.g., Earth's atmosphere), (2) a vacuum (e.g., space, atmosphere-less environment). Examples of aerospace vehicles that fly in (e.g., Earth's) atmosphere include variable-wing and fixed-wing aircraft (e.g., monoplanes, biplanes, gliders, commercial, military and private aircraft, etc.), rotorcraft (e.g., helicopters, autogyros, cyclogyros, compound rotorcraft, etc.), aerodynes (e.g., vertical and/or short take-off and landing (V/STOL) such as the Harrier, V-22 Osprey, etc.), unmanned aerial vehicles (UAVs), airships (e.g., dirigibles, blimps, Zeppelins, etc.), ornithopter (i.e., a wing flapping aircraft), and the like. Examples of aerospace vehicles that travel in space include spacecraft such as landers (crafts) (e.g., lunar lander, Mars lander, etc.), artificial satellites, and the like. Examples of aerospace vehicles that travel both in the atmosphere and in space include spaceplanes (e.g., Space Shuttle, X-37 Orbital Test Vehicle (OTV)), launch vehicles (e.g., rockets such as expendable launch vehicles, reusable rocket vehicles, vertical takeoff horizontal landing (VTHL) vehicles, etc.), and the like.

The term "grounded" used herein refers to situations where the aerospace vehicle is on a surface or ground (e.g., Earth, moon, Mars, etc.) being stationary (e.g., at rest or parked), moving (e.g., taxying, being towed, being transported), or at least partly suspended from the surface or ground (e.g., by a crane) in which the surface or ground is at least one of an area of land, at least one floating entity on a body of fluid (e.g., an aircraft carrier at sea), and at least partly carried by another entity such as another aerospace vehicle that is on a surface or in flight (e.g., aircraft transported within another aircraft, for example a helicopter transported within a military or cargo aircraft, a space shuttle carried on top of a transport aircraft, etc.).

The term "physical property" used herein refers to a property of a physical entity that is measurable. Examples of physical properties are strain, pressure, electrical conductivity, electrical resistance, electric potential, magnetic flux, magnetic field, capacitance, inductance, electromagnetic wave related properties (e.g., optical related properties such as radiance, luminance, refractive index, etc.), and the like.

The disclosed technique in general, involves measurement of a physical property in particular areas, and in at least one structural member of an aerospace vehicle (i.e., excluding the undercarriage itself) that exhibits or experiences a measureable change in its geometry (e.g., preferably where maximal) at least partly (typically predominately) due the weight of the aerospace vehicle while grounded. For the purpose of elucidating the disclosed technique, and without loss of generality, some parts will be described in terms of a particular selected physical property (e.g., strain), although the principles of the disclosed technique likewise apply (i.e., with appropriate adaptations, where applicable) to the measurement of other physical properties (e.g., pressure). The phrase "change in geometry" refers to a change in a shape, configuration, or form of an object (e.g., a structural member of the aerospace vehicle). Example changes in geometry include deformation or strain (e.g., as a result of a force (e.g., weight) being applied to the object, pressure, a relative change in configuration or displacement of an object (e.g., a piston, displacement measurement sensor, etc.), and the like. The change in geometry (e.g., deformation due to the weight of the aerospace vehicle) is assessed with respect to a reference (i.e., a reference geometric state, such as a reference deformation state). Hence, a current geometric state (e.g., current deformation state) is assessed with respect to a reference geometric state (e.g., a reference deformation state). A reference geometric state (e.g., of a structural member) may be chosen arbitrarily, for example, corresponding to when the aerospace vehicle is at its manufacturer's empty weight (MEW)), corresponding to when aerospace vehicle is at a known calibration weight, and the like. Other reference geometric states that may be chosen include specific sensor outputs that measure (directly or indirectly) the geometric state (e.g., a particular strain sensor output value, a camera acquiring images of a geometric state of an aerospace vehicle structural member, and a processor determining the change in geometry via image processing techniques). When the weight of aerospace vehicle changes (e.g., due to weight-loading) there is a corresponding change in geometry such as weight-induced deformation (e.g., of at least one structural member such as a fuselage section, wing section and an interface that interfaces between at least one of the fuselage section and wing section with an undercarriage). Deformation is generally defined as a transformation of an object from one configuration (e.g., reference configuration) to another configuration.

Reference is now made to FIG. 1, which is a schematic block diagram illustrating a weight and balance estimation system, generally referenced 100, constructed and operative in accordance with an embodiment of the disclosed technique. Weight and balance estimation system 100 includes a measurement subsystem 102, a processor 104, a memory 106, a communication subsystem 108, and a user interface 110. Measurement subsystem 102 includes at least one sensor, typically a plurality thereof, designated sensors $112_1$, $112_2$, ..., $112_N$ (where subscript N denotes a positive integer index). Processor 104 is coupled with measurement subsystem 102, memory 106, communication subsystem 108, and user interface 110. Alternatively, or additionally, communication subsystem 108 is coupled with measurement subsystem 102 (denoted by dotted line 116). Weight and balance estimation system 100 is configured and operative to be communicatively coupled with an external weight and balance calibration system 114 (i.e., not part weight and balance estimation system 100) for the purpose of calibration. Communication subsystem 108 is configured and operative to communicatively couple with external weight and balance calibration system 114 for the duration of the calibration procedure, as will be elaborated. Alternatively, or additionally, processor 104 is configured and operative to communicatively couple with external weight and balance calibration system 114 for the duration of the calibration procedure (as represented by dotted line 118).

Figure 2:
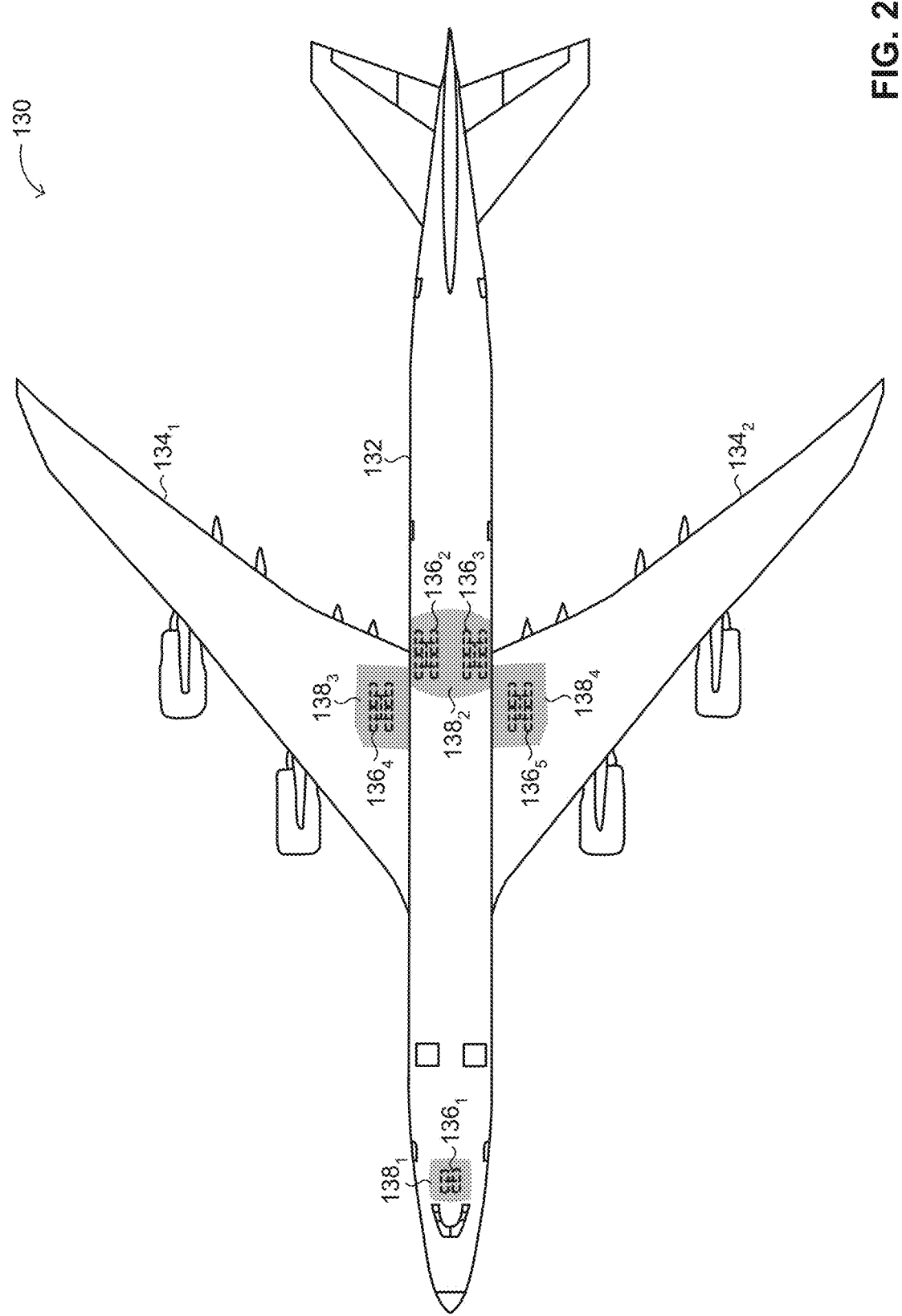
FIG. 2 is a schematic illustration of an aerospace vehicle showing a plurality of measurement areas, selected in accordance with the embodiment of the disclosed technique.

Reference is now further made to FIG. 2, which is a schematic illustration of an aircraft showing a plurality of physical property measurement areas, selected in accordance with the embodiment of the disclosed technique. Without loss of generality, FIG. 2 illustrates an example of an aerospace vehicle 130 having the general form of a commercial aircraft (and particularly, in this example, a Boeing® model 747-8) that includes a fuselage 132, main wings $134_1$, $134_2$, and landing gears $136_1$, $136_2$, $136_3$, $136_4$, and $136_5$. Landing gears $136_1$, $136_2$, and $136_3$ are coupled with different areas of fuselage 132, while landing gears $136_4$ and $136_5$ are each respectively coupled with areas of main wings $134_1$ and $134_2$. Further without loss of generality, the physical property selected to explicate the principles of the disclosed technique is strain and the physical property measurement areas will be described and interchangeably referred to as "strain measurement areas" or for brevity "measurement areas". Particularly, further shown is a plurality of strain measurement areas $138_1$, $138_2$ (located on fuselage 132), $138_3$, and $138_4$ (located respectively on main wings $134_1$ and $134_2$). Generally, a physical property measurement area is generally defined as an area on the aerospace vehicle where the physical property is measured. Specifically and for example, a strain measurement area is generally defined as an area on the aerospace vehicle where strain is measured. In particular, the physical property (e.g., strain) that is measured according to the principles of the disclosed technique is primarily caused by minute changes in geometry (e.g., deformations) of the airframe (i.e., excluding the landing gear) in areas that bear the most weight while the aerospace vehicle is grounded. The amount of change in the geometry is associated with and is relative to the amount of weight of the aerospace vehicle. For comparison, in an extreme case, the change of geometry is relative to a situation where aerospace vehicle 130 is in a weight-less environment (i.e., does not experience its weight (or acceleration)). Generally, the areas on the fuselage and/or wings of an aerospace vehicle typically bearing the most weight are those that couple (directly or indirectly) to, or in the vicinity of, the landing gears. Hence, measurement areas (e.g., strain measurement areas) are typically selected on at least one fuselage section and/or wing section and/or an interface that interfaces at least one of the fuselage section and wing section with the undercarriage of the aerospace vehicle that is adjacent, or in close proximity to the landing gears. An interface may be embodied, for example in the form of a coupler (e.g., a coupling member such as a shaft, mechanical fasteners, piston, adhesive, etc.), a thin structure (e.g., a sheet-like structure that interfaces between at least one of a fuselage section and wing sections with an undercarriage section), and the like.

Among other requirements (e.g., support of aerodynamic pressure distribution), the structure of aerospace vehicle 130 is required to support (i.e., resist and transmit) two different types of applied loads: ground loads (i.e., exhibited during ground movement (e.g., taxying, towing)) and aerodynamic loads (i.e., exhibited during flight). When aerospace vehicle 130 is grounded (e.g., parked) its undercarriages or landing gears as well as its structure function to distribute and bear the weight required to be supported (including the weight of the flight crew, passengers, cargo, fuel, supplies, etc.). For the sake of clarity, the main structures of a typical aerospace vehicle are the fuselage, wings, and landing gear (also interchangeably referred herein as "undercarriage"). Various parts of aerospace vehicle 130, for example, interfaces such as structural members, and couplings that interface and/or couple the landing gear with the fuselage and/or main wing sections exhibit greater weight bearing loads than other more distant parts (in relation to the undercarriage), such as the tail section or the vertical stabilizer structure. The structures and couplings ("structural elements") coupling the landing gear with the fuselage and/or main wing sections are viable areas for coupling sensors (e.g., strain sensors) for measuring changes in the geometry (e.g., deformation) of those areas, predominately due to the weight of the aerospace vehicle.

A typical coupling configuration (interface) between landing gears and the body (i.e., fuselage and wings) of the aerospace vehicle includes a trunnion (part of landing gear) that is configured to engage and couple (e.g., via trunnion pins—interface members that function as couplers) with landing gear support beams that are fixed to the fuselage or wing sections of the aerospace vehicle. The interface members may also function as dampers (e.g., springs, pistons).

Figure 3B:
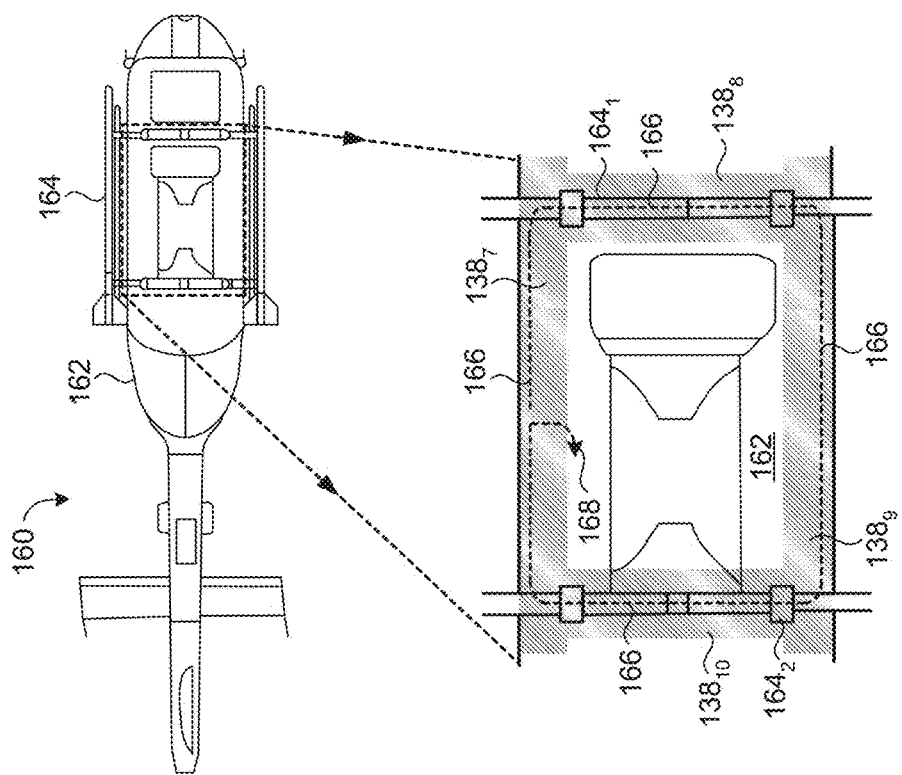
FIG. 3B is a schematic illustration showing measurement areas and sensor placement on a fuselage section of an exemplary rotorcraft, according to the principles of the disclosed technique.
Figure 3A:
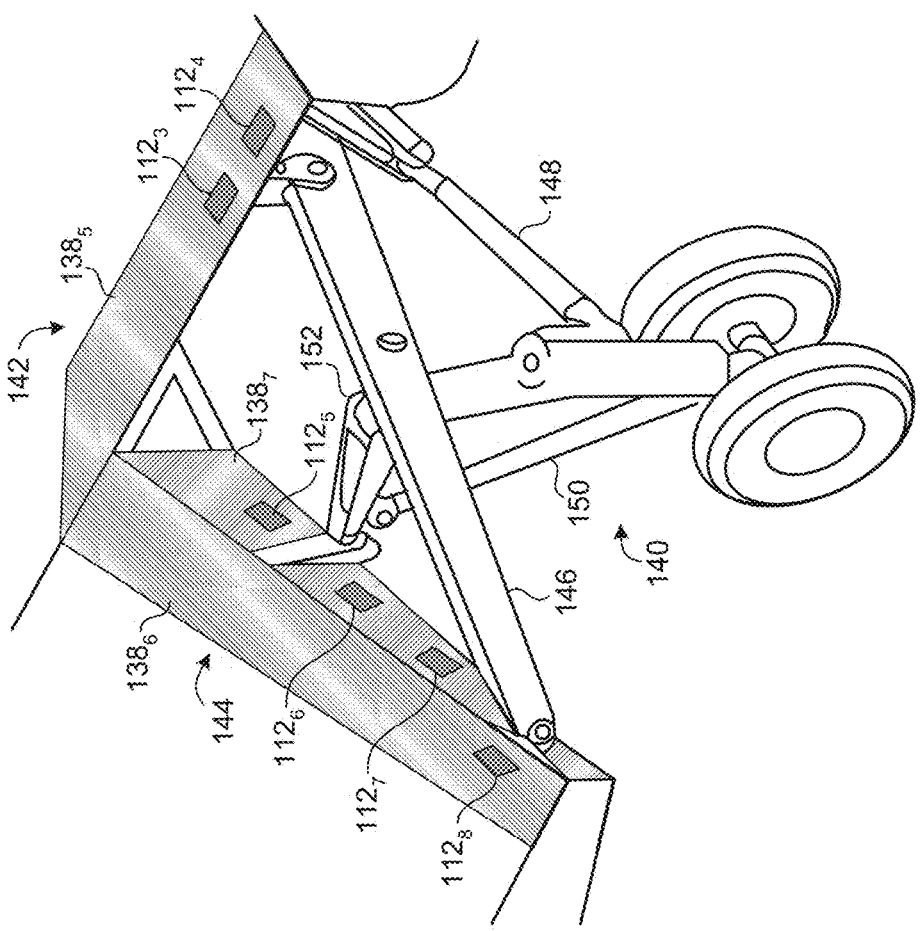
FIG. 3A is a schematic illustration showing measurement areas and sensor placement about a main gear support structure of an exemplary aircraft, according to the principles of the disclosed technique.

Reference is now made to FIG. 3A, which is a schematic illustration showing measurement areas and sensor placement about a main gear support structure of an exemplary aircraft, according to the principles of the disclosed technique. FIG. 3A illustrates a main gear support configuration of an exemplary aircraft in which the undercarriage (landing gear) 140 is partly supported by a fuselage section 142 and partly by a wing section 144 (wing box). A gear wing beam 146 pivotally couples undercarriage 140 with fuselage section 142 (at one end) as well as with wing section 144 (at another end). A side brace 148 couples undercarriage 140 with fuselage section 142, and a lower drag brace 150 couples undercarriage 140 with an upper drag brace 152, which in turn is coupled with wing section 144. FIG. 3A further shows a plurality of strain measurement areas $138_5$, $138_6$, $138_7$, as well as a plurality of strain sensors $112_3$, $112_4$, $112_5$, $112_6$, $112_7$, $112_8$. Particularly, strain measurement area $138_5$ is located on fuselage section 142, such to include the area where a part of gear wing beam 146 and a part of side brace 148 are coupled with and are at least partially supported by fuselage section 142. Strain measurement area $138_6$ is located on wing section 144, such to include the area where the other part of gear wing beam 146 is coupled with and at least partially supported by wing section 144. Strain measurement area $138_7$ is located on wing section 144, such to include the area where upper drag brace 152 is coupled with and is at least partially supported by wing section 144. Strain sensors $112_3$ and $112_4$ are coupled with fuselage section 142, and are located in strain measurement area $138_5$ in proximity to the coupling of gear wing beam 146 to fuselage section 142. Strain sensors $112_5$ and $112_6$ are coupled with wing section 144, and located at strain measurement area $138_7$ in proximity to the coupling of upper drag brace 152 to wing section 114. Strain sensors $112_7$ and $112_8$ are coupled with wing section 144, and are respectively located on strain measurement areas $138_7$ and $138_8$ in proximity to the coupling of gear wing beam 146 to wing section 144.

Strain measurement areas $138_5$, $138_6$, $138_6$ are located where a significant amount of the weight of undercarriage 140 (i.e., and therefore at least part of aerospace vehicle 130 being distributed among the landing gears) is supported by fuselage section 142 and wing section 144 (i.e., when aerospace vehicle 130 is grounded and undercarriage 140 is in an extended (non-retracted) position). Consequently, fuselage section 142 and wing section 144 typically exhibit measurable deformation that is predominately due to at least the partial weight of aerospace vehicle 130 being supported. Likewise, any interface (such as a mechanical coupler, fastener, thin sheet-like structure, pivot pin, etc.) that interfaces between an undercarriage (landing gear) and fuselage section 142 and/or wing section 144 may experience strain that is at least partly due to the weight of aerospace vehicle 130 when grounded. As such, the interface itself may be considered as having at least one strain measurement area (not shown). It is noted that the interface itself may be considered part of the fuselage and/or part of the wing and/or part of the undercarriage. It is further noted that according to one implementation the interface itself is constructed, configured, and operative to replace an existing interface (having no sensing capabilities) such as a pivot pin, mechanical coupler, etc. (and concurrently function the same as the interface it was intended to replace). According to another implementation the interface itself is constructed, configured, and operative to be retrofitted to an existing interface. Strain sensors $112_3$, $112_4$, $112_5$, $112_6$, $112_7$, $112_8$ are configured and operative to sense and measure this measurable deformation as strain exhibited by their associated strain measurement areas, corresponding to fuselage section 142 and wing section 144. From the individual strain measurements produced by the strain sensors, measurement subsystem 102 is configured and operative to determine the strain (i.e., at least one strain value) of at least one of fuselage section 142 and wing section 144 (typically both) and to produce strain data indicative the weight of aerospace vehicle 130. Measurement subsystem 102 also determines strain in fuselage and/or wing sections associated with or in proximity to the remaining landing gears of aerospace vehicle 130 (e.g., nose landing gear, left/right side main landing gears, and the like).

Alternatively, the sensors are embodied instead as pressure sensors (not shown) that are positioned at measurement areas in a manner that enables measurement of at least part of the pressure generated between at least one of fuselage section 142, wing section 144, and an interface that interfaces at least one of fuselage section 142 and wing section 144 with undercarriage 140, at least partly due to the weight of aerospace vehicle 130.

Further alternatively, the sensors are embodied as cameras (not shown), which are configured and operative to acquire measured data in the form of images (not shown) of at least one of fuselage section 142, wing section, and an interface that interfaces at least one of fuselage section 142 and wing section 144 with undercarriage 140 in at least two weight states (e.g., a reference weight state and a current weight state of aerospace vehicle 130) of aerospace vehicle 130. Processor 104 is configured and operative to receive these images from the cameras acquired at the two weight states (e.g., the reference weight state can be a reference calibration weight) and to determine a change in geometry (e.g., deformation) in a structural member of aerospace vehicle 130 corresponding to the two weight states. As will be described below in greater detail, based on the measured data from the sensors, processor 104 is configured to estimate the current weight of aerospace vehicle 130.

There is an assortment of coupling methods for coupling the sensors with fuselage section 142 and wing section 144. Examples include the use of mechanical fasteners, as well as adhesives such as thermosetting plastics (e.g., epoxy cements), cyanoacrylate cement, ceramic cements, polyester epoxies, and the like. The use of a particular coupling material and method has to ensure compatibility such that the coupling material allows proper transmission of the measured physical property such as strain or pressure from the measured object (specimen or sample) and the sensor (e.g., strain sensor, pressure sensor, respectively). The coupling material's physical and chemical properties are also taken into account, as it may possess a different coefficient of expansion with respect to the specimen and/or sensor. For instance, if the coupling material is an adhesive, its curing process is also taken into account, as the adhesive may experience temperature induced expansion, contraction caused by cooling, exhibit residual internal stresses, as well as a phenomenon of post-cure shrinkage, all of which may influence strain measurements.

The principles of the disclosed technique apply to various types of aerospace vehicles. To further demonstrate the multi-platform applicability, reference is now further made to FIG. 3B, which is a schematic illustration showing measurement areas and sensor placement on a fuselage section of an exemplary rotorcraft, according to the principles of the disclosed technique. FIG. 3B illustrates the case where aerospace vehicle 130 is a rotorcraft, such as helicopter 160. FIG. 3B (top) illustrates an exemplary rotorcraft (helicopter) 160 that includes a fuselage 162 and an undercarriage 164 (embodied in the form of landing skids, and fore and aft struts $164_1$, $164_2$). Undercarriage 164, which is coupled with a bottom part of fuselage 162, supports the weight of helicopter 160 while grounded. The bottom illustration of FIG. 3B, which is a partial enlargement of the top illustration, shows a plurality of strain measurement areas $138_7$, $138_8$, $138_9$, $138_{10}$ that are located on a bottom portion of fuselage 162, and which correspond to the locations where fuselage 162 exhibits the largest amount of strain when helicopter 160 is grounded. Particularly, (transverse) strain measurement areas 138$_8$ and 138$_{10}$ respectively encompass the entire span of fore and aft struts 164$_1$, 164$_2$, as the latter support the weight load of helicopter 160. Longitudinal strain measurement areas 138$_7$ and 138$_9$ extend at least partially along the two bottom longitudinal sides of fuselage 162 section. It is to be understood that different types, makes, and models of aerospace vehicles in general, and helicopter 160 in particular, would have different strain measurement areas, which depend, at least in part, on structure, configuration, and the specific nature of the coupling between the undercarriage and fuselage and/or wing sections whose areas exhibit (typically the most substantial) measurable deformation due to the weight of aerospace vehicle 130.

In accordance with a particular embodiment of the disclosed technique, and without loss of generality, measurement subsystem 102 employs electro-optical strain measurement techniques (e.g., Brillouin scattering sensing techniques, Rayleigh scattering sensing techniques, interferometric sensing techniques, Bragg grating sensing techniques, etc.). According to one example, measurement subsystem 102 includes at least one sensor embodied in the form of a fiber Bragg grating (FBG) sensor that employs an optical fiber 166 possessing at least one periodic variation in the refractive index of its fiber core. Optical fiber 166 is coupled with an onboard or off-board interrogator (represented by arrow 168). A description disclosing greater detail of such an embodiment will be provided hereinbelow in conjunction with FIGS. 8A-8D. Generally, at least part of the optical fiber 166 of the FBG sensor is coupled with (e.g., incorporated with, embedded into) a section of fuselage 162 along a path traversing at least part of strain measurement areas, as exemplarily shown in FIG. 3B. Measurement subsystem 102 employing the FBG sensor is configured and operative to determine strain in at least one strain measurement area in general, and typically a plurality of discrete strain measurement points or intervals along the optical fiber path in particular. In an alternative configuration, there is a plurality of FBG sensors each configured to determine strain in different or at least partially along overlapping paths (not shown). The coupling of optical fiber 166 to fuselage 162 may involve a diversity of methods, such as the use of adhesives (acrylics), and thermosetting polymers (e.g., polyimide), etc.

Figure 3E:
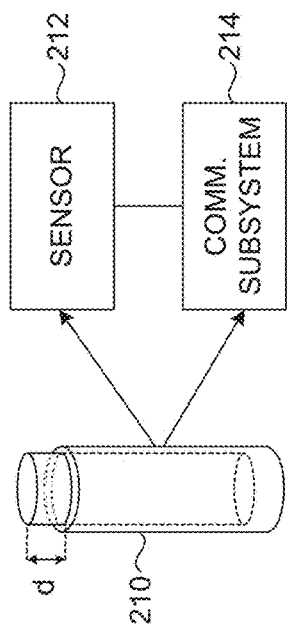
FIG. 3E is a schematic illustration showing an example interface, in greater detail, interfacing between fuselage section and an undercarriage of the exemplary aircraft shown in FIG. 3D, constructed and operative in accordance with the disclosed technique.
Figure 3F:
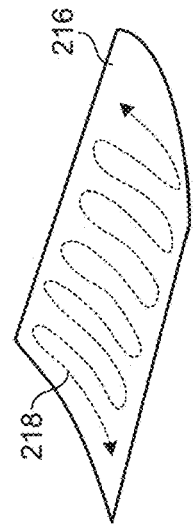
FIG. 3F is a schematic illustration showing another example interface, in greater detail, interfacing between fuselage section and an undercarriage of the exemplary aircraft shown in FIG. 3D, constructed and operative in accordance with the disclosed technique.
Figure 3C:
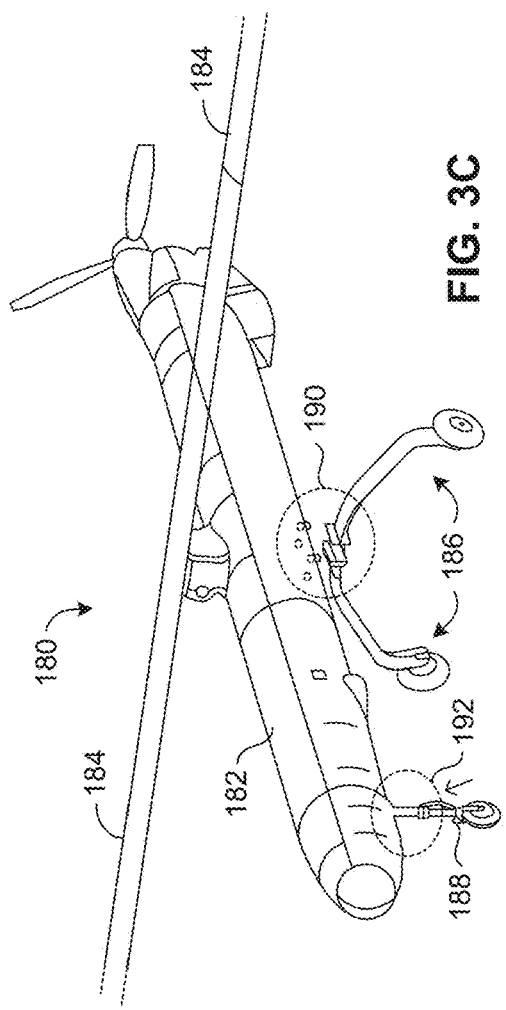
FIG. 3C is a schematic illustration showing an example of the applicability of the disclosed technique to another exemplary aircraft, according to the principles of the disclosed technique.
Figure 3D:
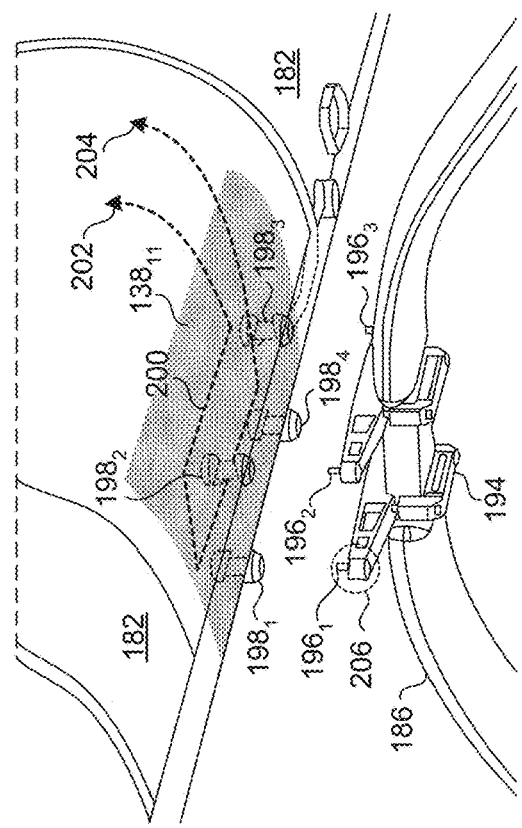
FIG. 3D is a schematic illustration of a bottom part, in greater detail, of the aircraft of FIG. 3C, showing measurement areas and sensor placement on a fuselage section in proximity to a main landing gear of the aircraft, constructed and operative in accordance with the disclosed technique.
Figure 3G:
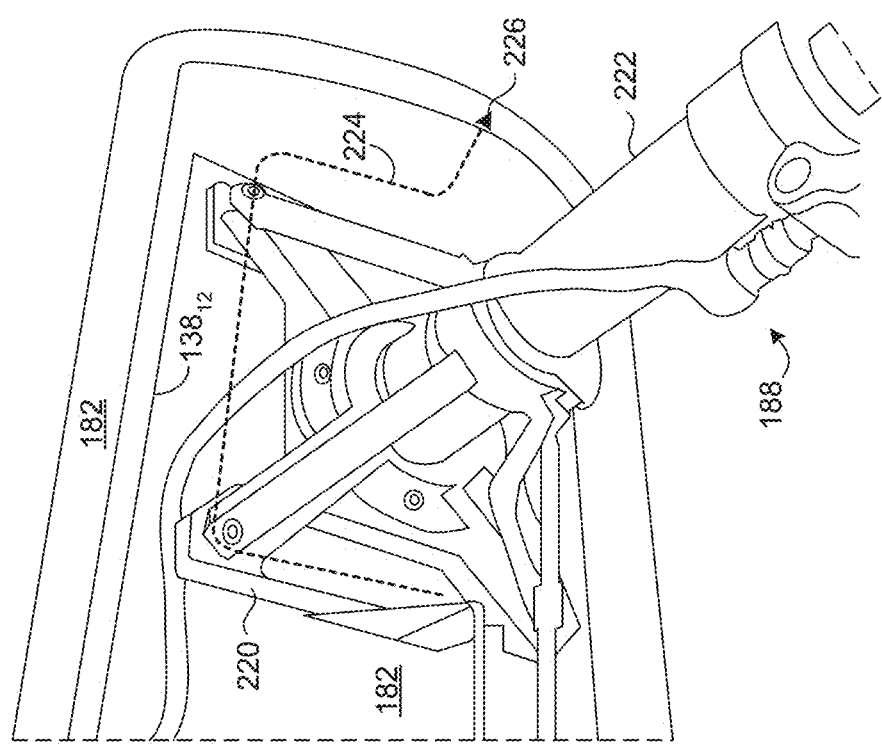
FIG. 3G is a schematic illustration of a bottom part, in greater detail, of aircraft of FIG. 3C, showing measurement areas and sensor placement on a fuselage section in proximity to a nose landing gear of the aircraft, constructed and operative in accordance with the disclosed technique.

Reference is now made to FIGS. 3C, 3D, 3E, 3F, and 3G. FIG. 3C is a schematic illustration showing an example of the applicability of the disclosed technique to another exemplary aircraft, according to the principles of the disclosed technique. FIG. 3D is a schematic illustration of a bottom part, in greater detail, of the aircraft of FIG. 3C, showing measurement areas and sensor placement on a fuselage section in proximity to a main landing gear of the aircraft, constructed and operative in accordance with the disclosed technique. FIG. 3E is a schematic illustration showing an example interface, in greater detail, interfacing between fuselage section and an undercarriage of the exemplary aircraft shown in FIG. 3D, constructed and operative in accordance with the disclosed technique. FIG. 3F is a schematic illustration showing another example interface, in greater detail, interfacing between fuselage section and an undercarriage of the exemplary aircraft shown in FIG. 3D, constructed and operative in accordance with the disclosed technique. FIG. 3G is a schematic illustration, in greater detail, of a bottom part of aircraft of FIG. 3C, showing measurement areas and sensor placement on a fuselage section in proximity to a nose landing gear of the aircraft, constructed and operative in accordance with the disclosed technique. FIGS. 3C, 3D, and 3G illustrate an example of aerospace vehicle 130 being a UAV (drone) 180 that includes a fuselage 182, wings 184, main landing gear (MLG) 186, and a front (nose) landing gear (NLG) 188. MLG 186 and NLG 188 are of the non-retractable type. The principles of the disclosed technique likewise apply to landing gears that are of the retractable type (e.g. as shown in FIG. 3A).

FIG. 3D shows portion 190 (FIG. 3C) of UAV 180 in greater detail. In particular, FIG. 3D illustrates a section of fuselage 182 and a section of MLG 186 decoupled (separated) from each other, thereby highlighting strain measurement area 138$_{11}$ being located on a bottom part of fuselage 182 that is configured to couple with MLG 186. Further shown is a rigid coupling base 194, a plurality of MLG coupling members 196$_1$, 196$_2$, 196$_3$, and 196$_4$ (not shown), a plurality of fuselage coupling members 198$_1$, 198$_2$, 198$_3$, and 198$_4$, and an FBG strain sensor 200 (i.e., partly embodied as an optical fiber). Rigid coupling base 194 is coupled (braces) with MLG 186, as well as with MLG coupling members 196$_1$, 196$_2$, 196$_3$, and 196$_4$ (i.e., via two longitudinal struts that at least partly form the rigid coupling base structure). Fuselage coupling members 198$_1$, 198$_2$, 198$_3$, and 198$_4$ are coupled with a bottom portion of fuselage 182, and are further configured and operative to couple (mate, pair) with corresponding MLG coupling members 196$_1$, 196$_2$, 196$_3$, and 196$_4$ at respective complementary positions. FBG strain sensor 200 is coupled with a bottom section of fuselage 182 in strain measurement area 138$_{11}$ that exhibits deformation predominately due to the weight of UAV 180. The example traversal circuit of FBG strain sensor 200 shown in FIG. 3D is along a path which enables multiple strain sensing points or intervals. Other paths within strain measurement area 138$_{11}$ are viable (not shown). FBG strain sensor 200 is coupled with other components of measurement subsystem 102 (represented by arrows 202 and 204) as will be described in greater detail hereinbelow in conjunction with FIGS. 8A-8D.

FIG. 3E partially shows circled portion 206 (FIG. 3D) of UAV 180 in greater detail. In particular, FIG. 3E shows an example interface 210 (embodied in the form of a coupler, e.g., a coupling shaft), that is configured and operative to interface between fuselage section 182 and undercarriage 186 of the exemplary aircraft 180 shown in FIG. 3D, and further configured and operative to include (e.g., incorporate, involve) and/or be associated with at least one sensor 212 (i.e., corresponding to at least one sensor 112$_1$, ..., 112$_N$ that is part of measurement subsystem 102—FIG. 1) for measuring a physical property (e.g., strain) exhibited at least partly as a result of the weight of UAV 180. The sensor associated with interface 210 is typically further coupled with a communication subsystem 214, which in turn is configured and operative to receive (e.g., strain) measurements from the (at least one) sensor and to provide these measurements to processor 104 (e.g., via communication subsystem 108). The particular example of interface 210 shown in FIG. 3E relies on a relative change in displacement (d) of parts thereof, so as to produce a signal that is at least partly dependent of the weight of UAV 180. Generally, sensor 212 measures a physical property in an area exhibiting a measurable change in geometry (e.g., displacement, change in configuration) at least partly due to the weight of UAV 180. A change in the geometry (e.g., of the interface) causes a corresponding change to the physical property being measured. Sensor 212 can be embodied, for example, in the form of a displacement sensor, pressure sensor, capacitance sensor (e.g., in which a change in the geometry (e.g., displacement) causes a corresponding change in capacitance), an inductance sensor, a strain sensor, an electrical resistance sensor, an electrical conductance sensor, a magnetic flux sensor, a magnetic field sensor, a general electromagnetic wave related sensor (e.g., optical based sensors), and the like.

FIG. 3F shows another example interface 216 (embodied in the form of a 2-D manifold or sheet-like structure), that is configured and operative to interface between an area of fuselage section 182 and an area of undercarriage 186 of UAV 180, and further configured and operative to include (e.g., incorporate, involve) and/or be associated with at least one sensor 218 (i.e., corresponding to at least one of sensors $112_1, \ldots, 112_N$—FIG. 1) for measuring a physical property, such as pressure or strain exhibited at least as a result of the weight of UAV 180. The particular example of interface 216 relies on strain being applied to the interface at both sides thereof (i.e., at one side that interfaces fuselage section 182, as well as the other side that interfaces the undercarriage 186). The example shown in FIG. 3F shows that sensor 218 associated with interface 216 is selected to be an FBG sensor, however, other types of sensors likewise apply (e.g., resistive strain sensors, capacitive strain sensors, semiconductor strain sensors, pressure sensors, and the like).

FIG. 3G shows portion 192 (FIG. 3C) of UAV 180 in greater detail. FIG. 3G illustrates a section of fuselage 182 and a section of NLG 188. A rigid coupling base 220 couples NLG 188 with fuselage 182. NLG 188 may typically include an oleo strut 222. A strain measurement area $138_{12}$ extends such to include the area where rigid coupling base 220 couples with fuselage 182. A strain sensor 224 (e.g., an FBG type, partly shown as an optical fiber) is coupled with a bottom section of fuselage 182 in strain measurement area $138_{12}$ that exhibits deformation predominately due to the weight of UAV 180. An example path of optical fiber 224 within strain measurement area $138_{12}$ is shown in FIG. 3G. Strain sensor 224 is coupled with measurement subsystem 102 (as represented by arrow 226). Alternatively, other paths of optical fiber 224 are viable (e.g., a rectangular path, elliptical path, etc.). Further alternatively, multiple strain sensors (of same or different type) may be employed (not shown).

In alternative implementations, and without loss of generality, strain sensor 200 is instead a resistive stain sensor, capacitive strain sensor, inductive strain sensor, semiconductor strain sensor, acoustical strain sensor, mechanical strain sensor, piezoelectric strain sensor, etc. Further alternatively, at least two strain sensors are employed and are of different type (not shown).

Measurement subsystem 102 (FIG. 1) is configured and operative to determine (i.e., may also be referred interchangeably herein as measure, assess, estimate) strain in strain measurement areas $138_1, 138_2, 138_3$, and $138_4$ (i.e., by measuring a physical property correlated with strain, such as electrical resistance outputted from a resistive-type strain gauge). In particular, sensors $112_1, 112_2, \ldots, 112_N$ of measurement subsystem 102 are distributed among, and installed at, measurement areas $138_1, 138_2, 138_3$, and $138_4$. Installation of the sensors can be achieved by a variety of methods. For example, according to a first sensor installation method, sensors $112_1, 112_2, \ldots, 112_N$ are integrated (at least partially or entirely) into the structure of fuselage 132 and sections of main wings $134_1$ and $134_2$ (FIG. 2) in measurement areas $138_1, 138_2, 138_3, 138_4$ (FIG. 2) during the manufacturing of aerospace vehicle 130. According to a second sensor installation method, sensors $112_1, 112_2, \ldots, 112_N$ are retrofitted to an existing aerospace vehicle 130 in measurement areas $138_1, 138_2, 138_3$, and $138_4$. According to a third sensor installation method, only part of sensors $112_1, 112_2, \ldots, 112_N$ are installed in the manufacturing process of aerospace vehicle 130 in measurement areas $138_1, 138_2, 138_3$, and $138_4$, while at least another part of sensors $112_1, 112_2, \ldots, 112_N$ is retrofitted in measurement areas $138_1, 138_2, 138_3$, and $138_4$ sometime following the manufacturing of aerospace vehicle 130.

Sensors $112_1, 112_2, \ldots, 112_N$ of measurement subsystem 102 are configured to measure a physical property correlated with a physical property such as strain in areas exhibiting measurable elastic deformation (i.e., strain measurement areas $138_1, 138_2, 138_3$, and $138_4$) that is at least (typically predominately) due to the weight of aerospace vehicle 130 while it is grounded. Measurement subsystem 102 is configured and operative to produce strain data indicative of the strain and also that is indicative of the weight of aerospace vehicle 130 while grounded. There are various ways in which the disclosed technique acquires strain measurements.

In accordance with one strain measurement technique, sensors $112_1, 112_2, \ldots, 112_N$ are embodied as strain sensors, also interchangeably referred herein as "gauges" that are configured and operative to exhibit, produce or output a measurable physical property, such as electrical conductance (or conversely resistance—in resistive strain gauges), capacitance (in capacitive strain gauges), inductance (in inductive strain gauges), etc. as a function of applied strain or changes in the sensor's geometry. Without loss of generality, for elucidating the principles of the disclosed technique, we will now arbitrarily select to describe particular aspects of the disclosed technique, by way of example, such that the sensor is a strain type sensor and the measured physical property of the strain sensor is electrical resistance. A strain sensitivity factor S (gauge factor) of each of strain sensors $112_1, 112_2, \ldots, 112_N$ (in the case they are embodied as the resistive strain gauge type) is known and generally given by:

$$S = \frac{1}{\varepsilon} \frac{\Delta R}{R_0}, \quad (1)$$

where $R_0$ is the electrical resistance of the strain gauge when unstrained, $\Delta R$ is the change in the electrical resistance of the strain gauge subjected to applied strain, and $\varepsilon$ is the strain. There are, however, other effects, apart from plain mechanical strain that influence the strain measurement. Example effects that may influence the strain measurement include the thermal expansion (or contraction) of the measurement object whose strain is measured, the temperature-dependence of the strain gauge, the temperature dependence of the electrical conductors (connecting wires), etc. Hence equation (1) represents a simplistic case where temperature effects are not taken into account. Weight and balance estimation system 100 is constructed, operative and intended for use with aerospace vehicles located in different environments varying in temperature. The disclosed technique takes into account such temperature-dependent effects on the measured strain. In general, the effect of temperature on the resistance of the strain gauge may be given by:

$$\frac{\Delta R}{R_0} = S \cdot \varepsilon + \alpha \cdot \Delta T, \quad (2)$$

where α is the temperature coefficient of the strain gauge, ΔT is the change in temperature and $\Delta R/R_0$ is a unit change in resistance from an initial reference resistance $R_0$ caused by a change in temperature. To measure strain of an object such as a fuselage section or a wing section of the aerospace vehicle, strain sensors are typically coupled with (e.g., embedded into or onto) the object that is measured, so that at least part of the strain is transmitted from the strained object to the strain sensor. In such a case, equation (2) may be modified to take into account temperature-induced strain effects of the object:

$$\frac{\Delta R}{R_0} = S \cdot \varepsilon + \alpha \cdot \Delta T + (\alpha_{O\_}\alpha) \cdot \Delta T, \qquad (3)$$

where $\alpha_o$ is the thermal expansion coefficient of the object. The newly added term in equation (3), namely $(\alpha_o\_\alpha)\cdot\Delta T$, vanishes if the thermal expansion coefficient of the strain gauge material is made to match that of object, which is one method of minimizing temperature effects on strain measurements, as will be elaborated hereinbelow.

The disclosed technique takes into account (i.e., corrects, compensates) the effect of temperature on the physical property being measured in general, and specifically as described by way of example on strain measurements in a variety of methods. The disclosed technique may employ self-temperature compensated strain sensors, as well as those that are non-self-temperature compensated. Generally, in non-self-temperature compensated strain sensors, a change in temperature of the strain sensor will produce a corresponding change in its thermal output (whereby the temperature-induced measurement change is independent of the stress-induced mechanical strain). Self-temperature compensated strain sensors, in contrast, are devised to exhibit minimal thermal output. In the example of resistive-type strain gauges that are non-self-temperature compensated, a temperature change of ΔT will produce a corresponding change in resistance ΔR. To at least partially counter the thermal output effect, which may be considered a significant source for strain measurement errors, according to one method of compensating for temperature variation effects on strain measurements, self-temperature compensated strain gauges may be employed, which may be constructed from, for example, sundry constantan alloys that are selected so as to match the material of the aerospace vehicle whose strain is to be measured.

Figures 4A, 4B, 4C:
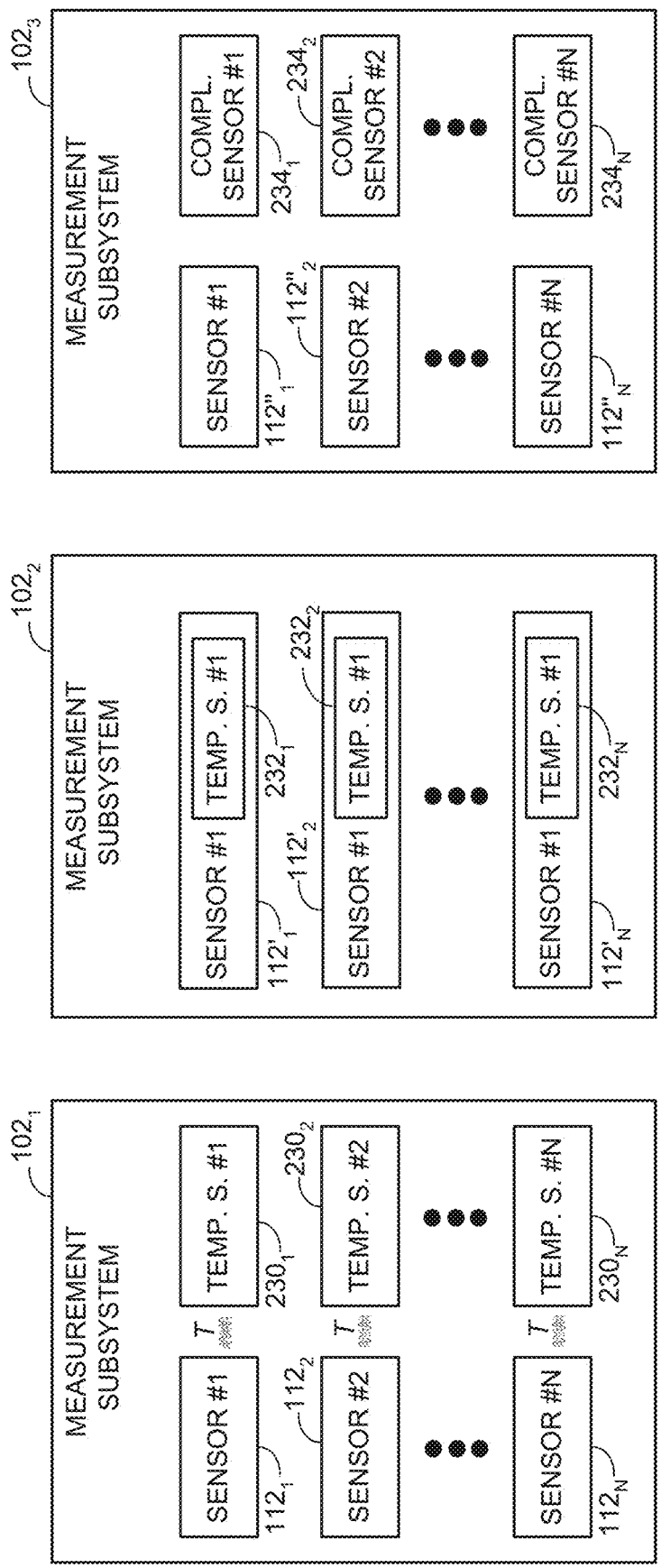
FIG. 4A is a schematic diagram illustrating an example method for compensating for temperature variation effects on strain measurements, constructed and operative in accordance with the disclosed technique.
FIG. 4B is a schematic diagram illustrating another example method for compensating for temperature variation effects on strain measurements, constructed and operative in accordance with the disclosed technique.
FIG. 4C is a schematic diagram illustrating a further example method for compensating for temperature variation effects on strain measurements, constructed and operative in accordance with the disclosed technique.

According to another compensation method for temperature variation effects on strain measurements, the measurement subsystem includes a plurality of temperature sensors each thermally coupled with a respective sensor, for measuring its temperature. To further elucidate the particulars of this method, reference is now further made to FIG. 4A, which is a schematic diagram illustrating an example method for compensating for temperature variation effects on strain measurements, constructed and operative in accordance with the disclosed technique. FIG. 4A illustrates a particular embodiment, denoted $102_1$, of the measurement subsystem shown in FIG. 1, constructed and operative to compensate (correct) for temperature variation effects on strain measurements. In addition to strain gauge sensors $112_1, 112_2, \ldots, 112_N$, measurement subsystem $102_1$ further includes a plurality of N separate temperature sensors $230_1, 230_2, \ldots, 230_N$ each thermally coupled (T) to a respective strain sensor (according to index number). In other words, temperature sensor $230_1$ is thermally coupled with strain sensor $112_1$, temperature sensor $230_2$ is thermally coupled with strain sensor $112_2$, and so forth. Each temperature sensor $230_1, 230_2, \ldots, 230_N$ is configured and operative to sense the temperature of its respective strain sensor $112_1, 112_2, \ldots, 112_N$ and to output respective temperature data. Measurement subsystem $102_1$ uses the temperature readings (data) outputted by each of the temperature sensors to compensate for the strain measurements outputted from sensors $112_1, 112_2, \ldots, 112_N$, according to a temperature compensation model (e.g., based on equation (2)).

According to a further compensation method for temperature variation effects on strain measurements, the measurement subsystem includes a plurality of temperature sensors that are each integrated into a respective strain sensor. To further elucidate the particulars of this compensation method reference is now further made to FIG. 4B, which is a schematic diagram illustrating another example method for compensating for temperature variation effects on strain measurements, constructed and operative in accordance with the disclosed technique. FIG. 4B illustrates another particular embodiment, denoted $102_2$, of the measurement subsystem shown in FIG. 1, whereby each strain sensor $112'_1, 112'_2, \ldots, 112'_N$ includes and incorporates a respective temperature sensor $232_1, 232_2, \ldots, 232_N$. Hence, strain sensor $112'_1$ includes temperature sensor $232_1$, strain sensor $112'_2$ includes temperature sensor $232_2$, and so forth. The temperature sensors are integrated into the construction of the strain sensors, such to measure their temperatures, so as to facilitate measurement subsystem $102_1$ in compensating for temperature variation effects on strain measurements (e.g., according to a temperature compensation model, based for example on equation (2)).

According to another compensation method for temperature variation effects on strain measurements, the measurement subsystem includes complementary (secondary) sensors to the (primary) measurement sensors that function to at least partially reduce (e.g., minimize, cancel) the temperature variation effects of the primary measurement sensors. To further elucidate the particulars of this compensation method reference is now further made to FIG. 4C, which is a schematic diagram illustrating a further example method for compensating for temperature variation effects on strain measurements, constructed and operative in accordance with the disclosed technique. FIG. 4C illustrates a further particular embodiment, denoted $102_3$, of the measurement subsystem shown in FIG. 1. Specifically, measurement subsystem $102_3$ includes strain measurements sensors $112''_1, 112''_2, \ldots, 112''_N$ (also denoted herein interchangeably as "primary", and which are identical respectively to strain measurement sensors $112_1, 112_2, \ldots, 112_N$ of FIG. 1), as well as complementary (also denoted herein interchangeably as "dummy" or secondary) sensors $234_1, 234_2, \ldots, 234_N$ to the primary strain measurement sensors. Hence, for each primary strain measurement sensor $112''_1, 112''_2, \ldots, 112''_N$ there is a respective secondary or complementary sensor associated or paired therewith. In other words, strain measurement sensor $112''_1$ is paired with complementary sensor $234_1$, strain measurement sensor $112''_2$ is paired with complementary sensor $234_2$, and so forth to $112''_N$ and $234_N$. Each complementary sensor is thermally coupled with a sample not subject to strain that is comprised from a material identical to the object whose strain is measured by its corresponding primary strain measurement sensor. Given that each pair of primary and secondary sensors are affected in the same manner to variations in temperature, measurement subsystem $102_3$ is configured to use the strain-induced measurement outputted by a primary sensor and the unstrained measurement outputted by the dummy sensor, both being at the same temperature, so as to derive a temperature compensated strain measurement. Alternatively, processor 104 is configured and operative to receive the strain-induced measurement outputted by the primary sensor and the unstrained measurement outputted by the dummy sensor, so as to derive a temperature compensated strain measurement. For example, in resistive-type strain gauges, given that the strain factor is known for both the primary and secondary strain sensors, processor 104 and/or strain measurement subsystem 102 solves equation (2) for ε, by measuring or determining the change in the electrical resistance, ΔR, at specifically measured temperatures.

According to a further temperature compensation method for temperature variation effects on strain measurements, weight estimation system 100 is configured and operative to filter out the effect of slowly changing temperature variations (i.e., when temperature changes relatively slowly with respect to the entire duration of the weight estimation procedure). Specifically, processor 104 filters out the effect of slowly changing temperature variations, by applying filtering techniques, such as by employing a low-pass filter, and the like.

In general, and in a similar manner to temperature, environmental factors (other than temperature, such as humidity, wind speed, solar radiation, etc.) that may influence measurements may be compensated for by various techniques. An example for one such technique employs the aforementioned primary and secondary (dummy) sensor approach, where the primary sensor is configured to sense a physical property (e.g., strain), while the secondary sensor is independent of the physical property and configured to sense the environmental factor that is to be compensated for. For such purposes, weight and balance estimation system 100 may further include additional environmental measurement sensors, such as at least one humidity sensor (not shown), at least one anemometer (not shown), at least one radiation detector (not shown), and the like. The environmental measurements acquired by these sensors are provided (e.g., transmitted) to processor 104 for processing, and for countering the environmental effects on the physical property being measured.

Weight and balance estimation system 100 includes multiple modes of operation. According to one mode of operation, measurement subsystem 102 acquires measurements of a physical property (e.g., strain, pressure), produces corresponding measured data, and transmits the measured data to processor 104, which in turn determines a measured property value, such as strain ε (e.g., from equation (3)). According to another mode of operation, measurement subsystem 102 acquires measurements, produces corresponding measured data, at least partially processes the measured data, and transmits the at least partially processed measured data to processor 104, which in turn determines a measured physical property (e.g., strain ε). According to a further mode of operation, measurement subsystem 102 acquires measurements, produces corresponding measured data, and processes the measured data to determine the physical property (e.g., strain ε). For each mode of operation, there exists a sub-mode for temperature compensation. According to one sub-mode, measurement subsystem 102 acquires temperature measurements (from at least one temperature sensor), produces corresponding temperature data, transmits the temperature data to processor 104, which in turn reduces temperature variation effects on physical property (e.g., strain) measurements. According to another sub-mode, measurement subsystem 102 acquires temperature measurements, produces corresponding temperature data, at least partially processes the temperature data into partially processed temperature effect compensation data, and transmits the at least partially processed temperature effect compensation data to processor 104, which in turn reduces (e.g., cancels) temperature variation effects on the physical property (e.g., strain) measurements. According to a further sub-mode, measurement subsystem 102 reduces temperature variation effects on acquired measurements (without substantive intervention of processor 104).

The disclosed technique includes a vehicle-specific calibration method that relates strain measurement data with different reference calibration weight measurements acquired at a reference temperature-controlled environment of the vehicle. This vehicle-specific calibration method involves several phases. Without loss of generality, the physical property selected to elucidate the calibration method is strain. To elucidate the vehicle-specific calibration method, reference is now further made to FIGS. 5A, 5B, 5C, and 5D. FIG. 5A is a schematic diagram showing a representative vehicle weight data acquirement technique in a vehicle-specific calibration method, constructed and operative in accordance with the embodiment of the disclosed technique. FIG. 5B is a schematic diagram showing a calibration graph of the thermal strain as a function of temperature, under a constant weight of aerospace vehicle. FIG. 5C is a schematic diagram showing a calibration graph of the mechanical strain as a function of weight of the aerospace vehicle being under constant temperature. FIG. 5D is a schematic diagram showing exemplary vehicle-specific strain-to-weight correspondence data, constructed through the vehicle-specific calibration method, in accordance with the embodiment of the disclosed technique. The vehicle-specific calibration method described in greater detail below is facilitated, at least in part, by processor 104 (FIG. 1) processing the acquired calibration data. Alternatively, according to another approach of the disclosed technique, the processing of the calibration data is achieved (wholly or in part) by at least one processor different (not shown) from processor 104, such as a remote computer, an on-site computer, via distributed computing methods, and the like.

FIG. 5A illustrates aerospace vehicle 130 situated in a temperature-controlled environment 240 that maintains a temperature T (that can be varied). FIG. 5A further shows one representative example of a weighing technique known in the art, employed by the disclosed technique for calibration purposes. According to a first phase in the calibration method, aerospace vehicle 130 is configured (e.g., arranged, placed, mounted in a level position) for weighting on an external (separate) weight and balance calibration system 114 (e.g., entailing aviation scales) that may include one or typically a plurality of weight measurement elements: a weight determination processor 114$_1$, and a plurality of platform scales 114$_2$, 114$_3$, and 114$_4$. External weight and balance calibration system 114 may also include a level subsystem (not shown) to ensure that aerospace vehicle 130 is maintained at a known attitude (e.g., a zero level position) throughout the calibration procedure. As shown in FIG. 5A, the wheels of aerospace vehicle 130 are placed correspondingly on platform scales 114$_2$, 114$_3$, and 114$_4$, which in turn are coupled with weight determination processor 114$_1$. Platform scales 114$_2$, 114$_3$, and 114$_4$ sense the weight that is applied thereto and generate corresponding signals, which in turn are communicated to weight determination processor 114$_1$ that interprets the signals to produce a corresponding output (termed interchangeably as "calibration weight data"

or "calibration weight measurement") indicative of the weight of aerospace vehicle 130. It is noted that without loss of generality, the disclosed technique may utilize other types of weighing systems and techniques for calibration, such as jack weighing techniques (not shown), landing gear weight measurement techniques, etc. External weight and balance calibration system 114 provides (e.g., transmits, communicates) the calibration weight data to processor 104 directly 118 (FIG. 1) or indirectly (e.g., via communication system 108). Processor 104 is configured and operative to receive the calibration weight data from external weight and balance calibration system 114 and to store this data in memory 106.

Once the weight of aerospace vehicle 130 is known from the aforementioned first phase, the vehicle-specific calibration method further involves a second phase of determining or isolating the temperature contribution or effect on the measured physical property. Particularly, in the present example, the contribution or effect of thermal strain on strain measurements that are acquired by sensors 112$_1$, . . . , 112$_N$ (i.e., as opposed to mechanical strain predominately due to the weight of aerospace vehicle 130). In general, the total strain experienced by an object involves a superposition (algebraic sum) of the mechanical strain $\varepsilon_M$ (i.e., describing shape changes, deformation, or relative displacement of particles in an object, resulting from mechanical stresses) and the thermal strain $\varepsilon_T$ (i.e., strain due to thermal effects, such as thermal expansion and contraction, thermal output (e.g., electrical resistivity, thermal expansion differential between signal conductor and test conductor, existent for example, in certain resistive-type strain gauges), etc.).

In particular, processor 104 is configured and operative to determine the thermal strain under constant weight of aerospace vehicle 130. Initially, processor 104 receives the calibration weight data from external weight and balance calibration system 114 (and may also monitor that the weight of aerospace vehicle 130 remains substantially constant during the calibration procedure). In addition, processor 104 is configured and operative to receive respective outputs from sensors 112$_1$, 112$_2$, . . . , 112$_N$ (resistance measurements) and to calculate $\Delta R/R_0$ (given a known initial reference resistance of $R_0$) at different temperatures T of temperature-controlled environment 240, such that $\Delta T = T - T_{ref}$ (where $T_{ref}$ denotes a known reference temperature). To this end, the temperature T of temperature-controlled environment 240 is capable of being altered (e.g., with respect to the reference temperature), the value T of which is provided to processor 104 (e.g., via communication system 108). For a plurality of values of T (or $\Delta T$ for that matter) and their respective values of $\Delta R/R_0$, processor 104 solves equation (2) for $\varepsilon$ as well as for constants S and $\alpha$, the latter two of which generally depend on the strain gauge material(s). Once constants S and $\alpha$ are determined, and assuming a constant weight of aerospace vehicle 130, the contribution of the thermal strain to the total strain measurement is known. FIG. 5B illustrates a representative calibration graph 242 of thermal strain $\varepsilon_T$ as a function of temperature (T) assuming aerospace vehicle 130 maintains a constant weight (W).

A third phase of the calibration procedure involves determining the contribution of the measured physical property (excluding the thermal effect). Particularly, in the present example the procedure involves determining the contribution of mechanical strain (excluding the contribution of thermal strain) as a function of the weight of aerospace vehicle 130 being under constant temperature. In this phase, the temperature of aerospace vehicle 130 within temperature-controlled environment 240 is kept constant (e.g., $T_{ref}$), while the weight of aerospace vehicle 130 is methodically varied (e.g., by progressively adding calibration weights of known value to the base weight (e.g., manufacturer's empty weight (MEW)) of aerospace vehicle 130). Measurement subsystem 102 determines the mechanical strain as a function of the weight of aerospace vehicle 130 measured by external weight and balance calibration system 114. FIG. 5C shows a calibration graph 244 of the mechanical strain as a function of weight of the aerospace vehicle being under constant temperature.

In a fourth phase of the calibration procedure, given the vehicle-specific behavior of the thermal effect (e.g., thermal strain) as a function of temperature under constant weight (determined in the second phase), as well as the physical property (e.g., mechanical strain) excluding the thermal strain as a function of weight under constant temperature (determined in the third phase), processor 104 is configured and operative to determine total physical-property-to-weight (e.g., strain-to-weight) correspondence (e.g., calibration) data associated with (e.g., specific to) aerospace vehicle 130. With reference to FIG. 5D, processor 104 constructs a database (e.g., lookup table) of vehicle-specific physical-property-to-weight (strain-to-weight) correspondence data 246 that relates the physical property (e.g., total determined strain) as a function of calibration-determined weight. In other words, for each total strain determined value $\varepsilon_i$, there exists a corresponding weight value $W_i$ (where i represents an index between 1 and m, and m is a positive integer representing the number of strain-to-weight pair values in the database). In general, for each physical property determined value, there exists a corresponding weight value, thereby forming physical-property-to-weight correspondence data, which associates the physical property value with a corresponding weight value. Memory 106 (FIG. 1) is configured and operative to store the strain-to-weight correspondence data 246. The vehicle-specific calibration method is applicable and is performed to each specific vehicle or type of vehicle (e.g., of the same make and model) whose weight estimation is required during operation of weight estimation system 100.

Following calibration, during operation of weight and balance estimation system 100, for a particular aerospace vehicle (e.g., 130) whose weight is required to be ascertained while grounded, and whose specific physical-property-to-weight (e.g., strain-to-weight) correspondence data is known or predetermined via the calibration method, there are two main modes of operation (i.e., for weight estimation). The first main mode of operation does not require the determination of the temperature of strain sensors 112$_1$, . . . , 112$_N$ as well as the object whose strain is to be measured (e.g., fuselage section, wing section). According to this approach, measurement subsystem 102 employs temperature compensated sensors and/or methods as described for example hereinabove, in conjunction with FIGS. 4A-4C. Measurement subsystem 102 is configured to determine strain in at least one of a fuselage section (or plurality thereof), a wing section (or plurality thereof) of aerospace vehicle 130, and an interface that interfaces between at least one fuselage section and wing section with an undercarriage of aerospace vehicle 130, in at least one area exhibiting measureable change in geometry (e.g., deformation) that is at least partly (or typically predominately) due to its weight, and to correspondingly produce (sampled) strain data. Processor 104 receives the sampled strain data from measurement subsystem 102, and estimates the weight of aerospace vehicle 130 by relating the determined (sampled) strain data with the strain-to-weight correspondence (e.g., calibration)

data associated with aerospace vehicle 130. This association may typically be specific (i.e., a particular aerospace vehicle), partly-specific (i.e., parameters related to the type, make, model, series, age, flight history, etc. of the aerospace vehicle), and the like. For example, for a determined (sampled) strain value $\varepsilon'$ there exists a corresponding and closest matching database strain value $\varepsilon$ (i.e., one of strain values $\varepsilon_1, \ldots, \varepsilon_m$ in strain-to-weight correspondence database 246). In general, the strain-to-weight correspondence data may typically be indicative of the behavior of a monotonic increasing function, whereby increasing strain values measured are indicative correspondingly of increasing weight. Processor 104 relates the determined (measured) physical property (strain value $\varepsilon'$) with one of a corresponding and closest matching database physical property (strain value $\varepsilon$) (e.g., via extrapolation), which in turn is associated with a respective weight value (determined in the calibration method). Thus, weight and balance estimation system 100 provides a weight estimation value for aerospace vehicle 130 by relating currently measured physical property measurement data (e.g., strain data) with a database weight value of aerospace vehicle 130, according to a predetermined relationship of physical-property-to-weight (e.g., strain-to-weight) correspondence data specific to aerospace vehicle 130.

According to a second main mode for weight estimation, measurement subsystem 102 employs non-self-temperature compensated strain sensors. According to this approach, weight and balance estimation system 100, in general, and measurement subsystem 102 in particular, include a plurality of temperature sensors (e.g., temperature sensors $180_1, \ldots, 180_N$, or $184_1, \ldots, 184_N$—FIGS. 4A-C) configured and operative to measure the temperature of their respective strain sensors, as well as the temperature of the object whose strain is measured (i.e., structural elements in the fuselage section(s) and/or wing section(s) and/or at least one interface that interfaces at least one of a fuselage section and wing section with the undercarriage of aerospace vehicle 130). Measurement subsystem 102 is configured and operative to calculate the change in temperature $\Delta T$ between the measured temperature (i.e., outputted by the temperature sensors) and a known reference temperature $T_{ref}$ (e.g., T=const., FIG. 5C), to further measure and calculate $\Delta R/R_0$, so to determine the strain $\varepsilon'$ (sampled strain data). Similarly, to the first mode of operation for weight determination, processor 104 receives the sampled strain data from measurement subsystem 102 and estimates the weight of aerospace vehicle 130 by relating the measured sampled strain data $\varepsilon'$ with the strain-to-weight correspondence data (i.e., a closest matching database strain value $\varepsilon$ (i.e., one of strain values $\varepsilon_1, \ldots, \varepsilon_m$), which in turn corresponds with an associated weight value (i.e., one of weight values $W_1, \ldots, W_m$)), associated with aerospace vehicle 130.

According to another aspect of the disclosed technique, weight and balance estimation system 100 is configured and operative to estimate balance of aerospace vehicle 130 while grounded. Balance is an important factor that affects the safety, operability, and efficiency of aerospace vehicle 130 during flight. Generally, an improperly balanced aircraft could result in reduced or impaired controllability of the aircraft during flight, which could possibly lead to an accident or damage. Additionally, an improperly balanced (e.g., nose-heavy, tail-heavy) aircraft would entail expending more energy in the form of engine power and consequently fuel, in order to maintain the aircraft in level flight. Knowing an aircraft's center of gravity (abbreviated herein "CG" or interchangeably "CoG", defined as the average location of the weight of the aircraft (where it is balanced)) in relation to its center of lift (abbreviated herein "CoL", defined as the location where the sum total of all lift is generated or considered to be concentrated) is crucial in determining its stability and controllability.

Figure 6:
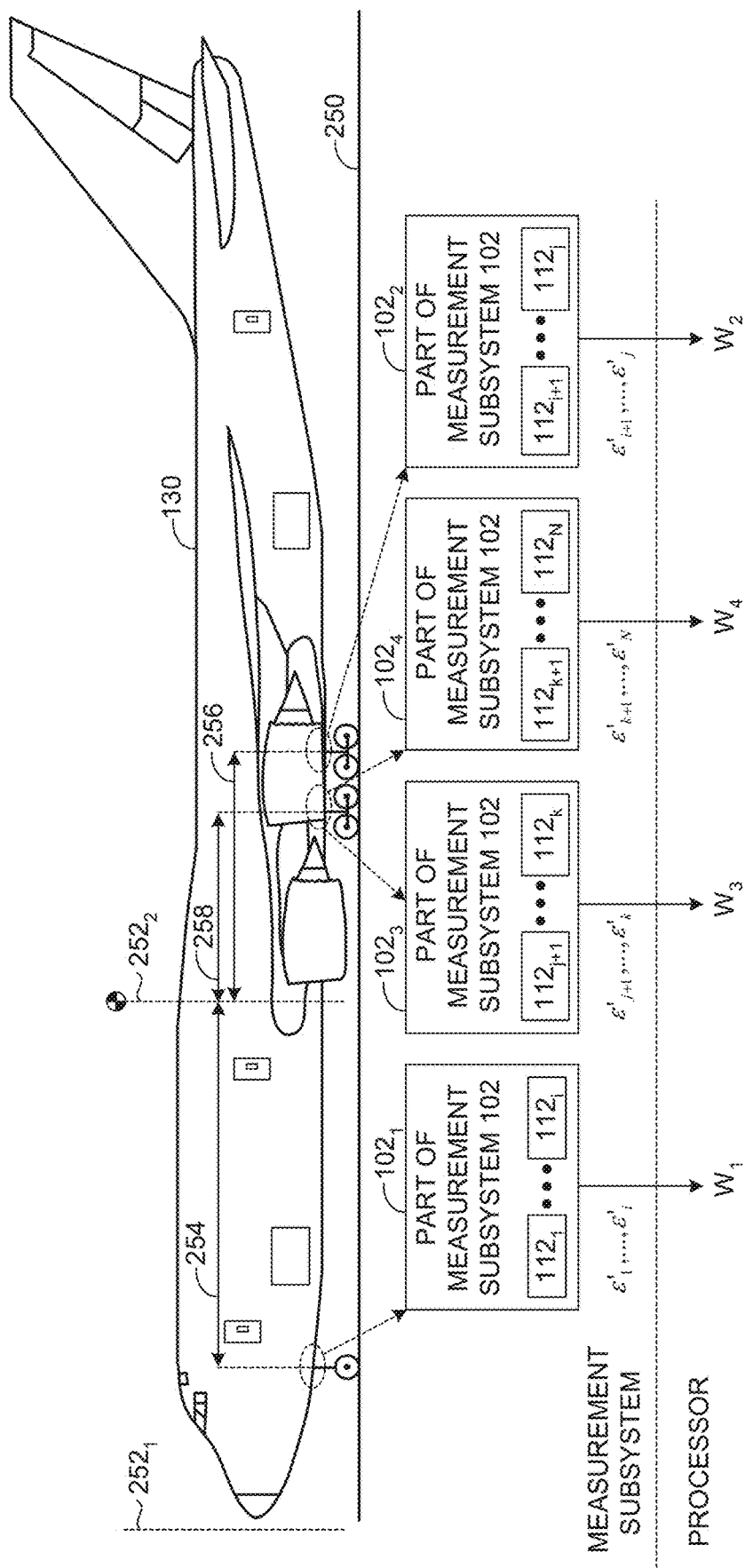
FIG. 6, which is a schematic illustration showing a method for estimating balance of the aerospace vehicle, constructed and operative in accordance with the embodiment of the disclosed technique.

The disclosed technique employs the determined estimated weight of aerospace vehicle 130 to derive an estimation of its point of balance or determined CG as will be elaborated in greater detail in the following description. Reference is now made to FIG. 6, which is a schematic illustration showing a method for estimating balance of the aerospace vehicle, constructed and operative in accordance with the embodiment of the disclosed technique. As shown in FIG. 6, aerospace vehicle 130 maintains a constant orientation with respect to ground 250. The procedure of estimating the balance involves determining if aerospace vehicle 130 is level (i.e., horizontal, or "level flight attitude"). An external level (e.g., electronic spirit level—not shown) coupled with (e.g., mechanically, optically) aerospace vehicle 130 is configured and operative to determine the attitude or level value of aerospace vehicle 130, produce corresponding attitude data. This attitude data is provided to processor 104 (e.g., level transmits attitude data to processor 104 via communication subsystem 108 (FIG. 1)). Alternatively, the inertial navigation system (INS) of aerospace vehicle 130 determines the attitude or level value. The attitude data (e.g., level value) is provided to processor 104 (e.g., manually via user interface 110 (FIG. 1), automatically via communication subsystem 108, etc.). Further alternatively, weight and balance estimation system 100 includes a level (not shown), coupled with processor 104, configured and operative to determine the attitude or level value of aerospace vehicle 130.

Balance estimation involves determining moments of force (torques) with respect to a reference datum (also denoted interchangeably herein as "datum"). The datum is an imaginary vertical reference plane from which horizontal distance measurements are made or computed for the purpose of balance estimation. FIG. 6 shows a typical (e.g., Boeing®) reference datum $252_1$ located in front of the nose of aerospace vehicle 130, as well as another reference datum $252_2$. Without loss of generality, we select to use reference datum $252_2$ for describing the principles of balance estimation according to the disclosed technique. Generally, for each aircraft, the position of different components is identified with respect to the datum. The datum is typically indicated in the Aircraft Specifications, Spacecraft Specification, etc. The positions (coordinates) of sensors $112_1, \ldots, 112_N$ are also known or measured with respect to datum $252_2$. Strain sensors $112_1, \ldots, 112_N$ are positioned at various respective strain measurement areas $138_1$, $138_2$ $138_3$, and $138_4$ (FIG. 2). With reference to FIGS. 2 and 6A, measurement subsystem 102 is arranged and configured as a plurality of distinct and distanced apart sensor clusters $102_1$, $102_2$, $102_3$, and $102_4$ that are distributed at respective strain measurement areas $138_1$, $138_2$ $138_3$, and $138_4$. Hence, the sensors are grouped in sensor clusters that are distributed among the (e.g., strain) measurement areas. In particular, sensor cluster $102_1$ includes sensors $112_1, \ldots, 112_i$ (where i≤1<N is a positive integer index (if i=1 then there is only one sensor in sensor cluster $102_1$)), sensor cluster $102_2$ includes sensors $112_{i+1}, \ldots, 112_k$ (where j≤i+1<N is a positive integer index (if j=i+1 then there is only one sensor in sensor cluster $102_2$), sensor cluster $102_3$ includes sensors $112_{k+1}, \ldots, 112_k$ (where k≤j+1<N is a positive integer index (if k=j+1 then there is only one sensor in sensor cluster $102_3$), and sensor cluster $102_4$ includes sensors $112_{k+1}, \ldots$ , $112_N$ (if k+1=N then there is only one sensor in sensor cluster $102_4$). Thus, there is at least one sensor in each sensor cluster. Each sensor cluster and particularly, each sensor in a particular sensor cluster, is associated with a particular strain measurement area. Specifically, sensor clusters $102_1$, $102_2$, $102_3$, and $102_4$ (FIG. 6) are associated with, and are further configured and operative to determine or measure a physical property such as strain, respectively in measurement areas $138_1$, $138_2$ $138_3$, and $138_4$ (FIG. 2). Each sensor in a sensor cluster produces a respective determined or measured physical property value (e.g., strain value ε'). Specifically, sensors $112_1, \ldots, 112_i$ (in sensor cluster $102_1$) are configured to produce respective (strain values $\varepsilon'_1, \ldots, \varepsilon'_i$, sensors $112_{i+1}, \ldots, 112_j$ (in sensor cluster $102_2$) are configured to produce respective strain values $\varepsilon'_{i+1}, \ldots, \varepsilon'_j$, sensors $112_{j+1}, \ldots, 112_k$ (in sensor cluster $102_3$) are configured to produce respective stain values $\varepsilon'_{j+1}, \ldots, \varepsilon'_k$, and sensors $112_{k+1}, \ldots, 112_N$ (in sensor cluster $102_4$) are configured to produce respective strain values $\varepsilon'_{k+1}, \ldots, \varepsilon'_N$. As aforementioned, for each determined or measured strain value ε' there is associated a substantially closest matching database strain value ε, which in turn is associated with a respective weight value (determined in the calibration method). For each sensor cluster, processor 104 receives the individual strain values from each sensor and processes them (e.g., collectively by averaging) so as to produce a corresponding weight value that is associated with its respective sensor cluster. Specifically, for sensor clusters $102_1$, $102_2$, $102_3$, and $102_4$, processor 104 is configured to produce corresponding weight values $W_1$, $W_2$, $W_3$, and $W_4$ as shown in FIG. 6.

The horizontal distance (i.e., the arm) of each sensor cluster (and each sensor in that cluster) with respect to datum $252_2$ is known or measured. Particularly, sensor cluster $102_1$ has an arm 254 (negative), sensor cluster $102_2$ has an arm 256 (positive), and sensor clusters $102_3$ and $102_4$ have an arm 258 (positive). Processor 104 determines individual moments $\tau_1, \tau_2, \tau_3$, and $\tau_4$ by multiplying each corresponding weight value $W_1$, $W_2$, $W_3$, and $W_4$ by its respective arm value $r_1$ (arm 254), $r_2$ (arm 256), $r_3$ (arm 258), and $r_4$ (arm 258). Hence, $\tau_1=r_1 \times W_1$, $\tau_2=r_2 \times W_2$, $\tau_3=r_3 \times W_3$, and $\tau_4=r_4 \times W_4$. To determine if aerospace vehicle 130 is appropriately balanced, processor 104 is configured and operative to compute a determined CG and to compare it with the manufacturer's known CG (corresponding to the relevant configuration of aerospace vehicle 130) so as to assess if the determined CG is within the allowable range. In general, the CG is the point about which the sum of all the individual moments corresponding to all the masses of all the constituents is zero. Processor 104 computes the determined CG by combining (adding) all of the moments together and dividing by the (total) estimated weight of aerospace vehicle 130 (as detailed above), so as to obtain the total (overall) moment arm. Processor 104 is configured and operative to compare the total moment arm with respect to allowable CG limits (e.g., a limit range) that is specific to each aerospace vehicle type. The allowable CG limits define the maximum CG limits by the aerospace vehicle manufacturer for proper and safe operation thereof. Based on this comparison, processor 104 is further configured and operative to generate corresponding balance data, and to direct user interface 110 (e.g., via a display—not shown) to generate an indication (e.g., a visual indication (e.g., via lights, images), an audible indication (e.g., via an alarm, voice), a tactile indication (e.g., via vibrations), etc. for a user, a pilot, ground crew, etc.) to the extent or quantity that the total moment arm is within or outside the allowable CG limits. Typically, memory 106 stores data corresponding to the allowable specified CG limits (termed herein "allowable CG limits data") of the particular aerospace vehicle being weighed and balanced. Alternatively, a user (e.g., technical ground personnel, aircraft flight crew, etc.) provides the allowable CG limits data to weight and balance estimation system 100 through user interface 110 and/or communication subsystem 108.

Although the preceding description was portrayed in terms of a longitudinal CG axis of the aerospace vehicle as shown in FIG. 6 (i.e., nose-to-tail of aerospace vehicle 130), the general principles herein described likewise apply to other CG axes of the aerospace vehicle, such as along lateral and vertical directions. In general, weight and balance estimation system 100 is configured and operative to determine CG along at least one axis. In particular, and as an example, for a general airplane there are typically three principal axes about which weight and balance estimation system 100 determines CG, namely, a longitudinal axis typically extending longitudinally along the fuselage (nose-to-tail), a lateral axis typically extending transversely (wing-to-wing), and a vertical axis extending perpendicular to the normal line of flight. The longitudinal, lateral, and vertical axes mentioned may or may not correspond to the principal axes of the aerospace vehicle (i.e., each may be shifted in relation to a respective principal axis). In addition, weight and balance estimation system 100 is configured and operative to determine CG along an arbitrary oblique axis (a slanted direction to one of the principal axes). Thus, for practically determining longitudinal CG (or "longitudinal balance", denoted herein "CG(x)", where "x" represents a longitudinal axis in an XYZ three dimensional (3-D) Cartesian coordinate system), measurement subsystem 102 includes at least two sensors (or sensor clusters) configured and operative to measure strain in at least two strain measurement areas that are (longitudinally) distanced apart (e.g., $138_1$, $138_2$—FIG. 2), whereby the sensors have known (sensor) positions with respect to a reference (e.g., datum $252_2$). Processor 104 is configured and operative to receive the respective measured strain data from the sensors (or sensor clusters) and determine CG(x), as discussed above, based on the individual weight values (determined from the respective strain data, sensor position (arm), strain-to-weight correspondence data).

For practically determining lateral CG (or "lateral balance", denoted herein "CG(y), where "y" represents a lateral axis in the XYZ coordinate system), measurement subsystem 102 includes at least two sensors (or sensor clusters) configured and operative to measure strain in at least two strain measurement areas that are (laterally) distanced apart (e.g., $138_3$, $138_4$—FIG. 2), whereby the sensors have known (sensor positions) with respect to a reference (e.g., datum $252_2$). Likewise to longitudinal CG, processor 104 is configured and operative to receive the respective measured strain data from the sensors (or sensor clusters) and determine CG(y).

For practically determining vertical CG (or "vertical balance", denoted herein "CG(z)", where "z" represents a vertical axis in the XYZ coordinate system), measurement subsystem 102 includes at least two sensors (or sensor clusters) configured and operative to measure strain in at least two strain measurement areas that are either laterally distanced apart (e.g., $138_3$, $138_4$—FIG. 2), or longitudinally distanced apart (e.g., $138_1$, $138_2$—FIG. 2) (or both), and these strain measurements are performed at two different attitudes (angle of rotation (pitch) or measured angle from level) of aerospace vehicle 130. A first attitude (denoted by $\alpha_1$) may arbitrarily be chosen (e.g., level attitude), while the second attitude (denoted by $\alpha_2$) is selected to be different from $\alpha_1$. A level (not shown), INS (not shown), and the like are used to determine and verify the first and second attitudes. Processor 104 is configured and operative to receive the respective measured strain data from the sensors (or sensor clusters) and determine CG(z), further based on the first and second attitude values, according to known computational models.

Weight and balance estimation system 100 is capable of determining balance of aerospace vehicle 130 at different configurations or loading conditions (e.g., a fully or partially fueled configuration, a payload loaded configuration, a passenger loaded configuration, combinations thereof, etc.), as it is known that that the CG changes in different configurations. In case aerospace vehicle 130 is not level, processor 104 is configured to compute the determined GC such that it is compensated for the current attitude of aerospace vehicle 130.

Especially if aerospace vehicle 130 is a helicopter, a lunar lander, and the like, processor 104 is configured and operative to determine CG along at least one but typically more than one axis, which may be defined differently for an airplane. For rotorcrafts, such as helicopters it is advantageous to determine CG along at least two axes, such as a longitudinal CG axis (i.e., indicating the fore-to-aft balance), a lateral CG axis (i.e., indicating the right-to-left balance), as well as a vertical CG axis (indicating top-to-bottom balance). If aerospace vehicle 130 is a large aircraft (e.g., commercial passenger), the weight and balance is typically expressed in terms of a percentage of mean aerodynamic chord (MAC).

It is further noted that for a lunar lander (or planetary lander), weight and balance estimation system 100 is configured to take into account during the calibration phase as well as in the estimation of weight, the corresponding value of the acceleration due to gravity (e.g., on the moon, a is approximately 1.62 m/s$^2$). Weight and balance estimation system 100 is further configured and operative to take into account during the calibration phase as well as during weight estimation the corresponding value of the acceleration due to gravity (i.e., on Earth, it is denoted by g, having an approximate value of 9.8 m/s$^2$). It is known that the acceleration due to gravity on Earth varies with geographical location (e.g., this can be expressed as coordinates of latitude, longitude, altitude). Weight and balance estimation system 100 is configured and operative to receive location data indicating the current position or coordinates of aerospace vehicle 130 via a location system (not shown), such as a global navigation satellite system (GNSS) (e.g., the Global Positioning System (GPS), the GLObal NAvigation Satellite System (GLONASS), the Galileo satellite navigation system, etc.), and the like. Typically, aerospace vehicle 130 may include a GNSS (not shown) configured and operative to provide current location information pertaining to a (global) location of aerospace vehicle 130 to processor 104, which in turn uses this location information along with respective acceleration values (e.g., stored in memory 106 as a lookup table) in the estimation of weight and balance of aerospace vehicle 130. Alternatively, a user can provide location information to processor 104 via user interface 110 (FIG. 1). Knowing the location (geographical, coordinates) of aerospace vehicle 130 and thus a more accurate value of the acceleration due to gravity associated therewith generally augments the weight and balance estimation of the aerospace vehicle.

Reference is now made to FIGS. 7A, 7B, and 7C. FIG. 7A is a schematic block diagram of a preliminary physical-property-to-weight calibration method, generally referenced 280, constructed and operative in accordance with the embodiment of the disclosed technique. FIG. 7B is a schematic block diagram of a method for estimating weight of an aerospace vehicle, generally referenced 300, constructed and operative in accordance with the embodiment of the disclosed technique. FIG. 7C is a schematic block diagram of a method for estimating balance of the aerospace vehicle, generally referenced 320, constructed and operative in accordance with the embodiment of the disclosed technique.

Referring to FIG. 7A, method 280 initiates in procedure 282, in which an aerospace vehicle is weighed on an external weight calibration system, thereby producing calibration weight data. With reference to FIGS. 1 and 5A, external weight and balance calibration system 114 (FIG. 1) measures the weight of aerospace vehicle 130 (FIG. 5A), thereby producing calibration weight data.

In procedure 284, the contribution of the thermal effect (e.g., thermal strain) on a measured physical property (e.g., strain measurements) acquired in at least one of a fuselage section, a wing section, and an interface that interfaces at least one of the fuselage section and wing section with an undercarriage of the aerospace vehicle, in an area exhibiting measurable deformation that is at least partially due to the weight of the aerospace vehicle is determined. With reference to FIGS. 1, 2 and 5B, sensors $112_1, \ldots, 112_N$ (FIG. 1) measure the strain exhibited by the deformation of at least one fuselage 132 section (e.g., FIG. 2) and/or wing $134_1$, $134_2$ section (e.g., FIG. 2) of aerospace vehicle 130. With further reference to FIGS. 3E and 3F sensor 212 (FIG. 3E) and sensor 218 (FIG. 3F) measure strain (or another physical property such as pressure, electrical conductivity, electrical resistance, electric potential, magnetic flux, magnetic field, capacitance, inductance, electromagnetic wave related property, etc.) at the interface between fuselage section 182 and undercarriage 186 of UAV 180. Processor 104 (FIG. 1) determines thermal strain $\varepsilon_T$ under constant weight of the aerospace vehicle, as represented by calibration graph 242 (FIG. 5B).

In procedure 286, the contribution of the measured physical property (e.g., mechanical strain) (excluding thermal effect) on the physical property (e.g., strain) measurements acquired in at least one of a fuselage section, a wing section, and an interface that interfaces at least one of the fuselage section and wing section with an undercarriage of the aerospace vehicle, in an area exhibiting measurable deformation that is at least partially due to the weight of aerospace vehicle is determined. With reference to FIGS. 1, 2 and 5C, strain sensors $112_1, \ldots, 112_N$ (FIG. 1) measure the strain exhibited by the deformation of at least one fuselage 132 section (e.g., FIG. 2) and/or wing $134_1$, $134_2$ section (e.g., FIG. 2) of aerospace vehicle 130. With further reference to FIGS. 3E and 3F sensor 212 (FIG. 3E) and sensor 218 (FIG. 3F) measure strain (or another physical property such as pressure, etc.) at the interface between fuselage section 182 and undercarriage 186 of UAV 180. Measurement subsystem 102 (FIG. 1) determines the mechanical strain as a function of the weight of aerospace vehicle measured by external weight and balance calibration system 114. Data pertaining to the contribution of the mechanical strain on strain measurements is exemplarily represented by calibration graph 244 (FIG. 5C).

In procedure 288, physical-property-to-weight (e.g., strain-to-weight) correspondence data associated with the aerospace vehicle is determined (e.g., according to the determined thermal strain, the mechanical strain, and the calibration weight data). With reference to FIGS. 1, 5B, 5C, and 5D, processor 104 (FIG. 1) constructs a database (e.g., lookup table) of vehicle-specific strain-to-weight correspondence data 246 (FIG. 5D) that relates the total determined strain as a function of calibration-determined weight, according to the determined thermal strain (FIG. 5B), the mechanical strain (FIG. 5C) and the calibration weight data.

Referring now to FIG. 7B, method 300 initiates in procedure 302, in which during operation of weight and balance estimation system 100, a physical property (e.g., strain) in at least one of a fuselage section, a wing section, and an interface that interfaces at least one of fuselage section and a wing section of an aerospace vehicle, in at least one area exhibiting measurable change in geometry (e.g., deformation) that is at least partially due to the weight of the aerospace vehicle is determined. With reference to FIGS. 1, 2 and 5B, measurement subsystem 102 (FIG. 1) including strain sensors $112_1$, $112_2$, ..., $112_N$ determines the strain exhibited by the deformation of at least one fuselage 132 section (e.g., FIG. 2) and/or wing $134_1$, $134_2$ section (e.g., FIG. 2) of aerospace vehicle 130 that is at least partially due to the weight of the aerospace vehicle 130. With further reference to FIGS. 3E and 3F sensor 212 (FIG. 3E) and sensor 218 (FIG. 3F) measure strain (or another physical property such as pressure, etc.) at the interface between fuselage section 182 and undercarriage 186 of UAV 180.

In procedure 304, measurement data indicative of the weight of the aerospace vehicle is determined, according to the measured physical property. With reference to FIGS. 1 and 6, measurement subsystem 102 (FIG. 1) produces strain data: values $\varepsilon'_1, \ldots, \varepsilon'_i$ (sensors $112_1, \ldots, 112_i$ (in sensor cluster $102_1$)), strain values $\varepsilon'_{i+1}, \ldots, \varepsilon'_j$ (sensors $112_{i+1}, \ldots, 112_j$ (in sensor cluster $102_2$)), stain values $\varepsilon'_{j+1}, \ldots, \varepsilon'_k$ (sensors $112_{j+1}, \ldots, 112_k$ (in sensor cluster $102_3$)), and strain values $\varepsilon'_{k+1}, \ldots, \varepsilon'_N$ (sensors $112_{k+1}, \ldots, 112_N$ (in sensor cluster $102_4$)), indicative of the weights ($W_1$, $W_2$, $W_3$, and $W_4$, respectively) of the aerospace vehicle 130 according to the determined strain.

In procedure 306, the weight of aerospace vehicle is estimated by relating the measured data with predetermined physical-property-to-weight correspondence data, associated with the aerospace vehicle. With reference to FIGS. 1 and 5D, processor 104 (FIG. 1) relates the strain data acquired by measurement subsystem 102 with predetermined strain-to-weight correspondence data 246, associated with aerospace vehicle 130.

Referring now to FIG. 7C, method 320 initiates in procedure 322, in which during operation of weight and balance estimation system, at least two partial weight values of the aerospace vehicle is estimated with respect to a reference datum. With reference to FIGS. 1 and 6, processor 104 (FIG. 1) estimates partial weight values $W_1$, $W_2$, $W_3$, and $W_4$ (FIG. 6) with respect to a reference datum $252_2$ (FIG. 6).

In procedure 324, moments of force corresponding to the estimated at least two partial weight values are determined with respect to a reference datum. During operation of weight and balance estimation system, at least two partial weight values of the aerospace vehicle are estimated with respect to a reference datum. With reference to FIGS. 1 and 6, processor 104 (FIG. 1) determines individual moments of force $\tau_1$, $\tau_2$, $\tau_3$, and $\tau_4$ corresponding to individual weight values $W_1$, $W_2$, $W_3$, and $W_4$ (and arms—FIG. 6), with respect to reference datum $252_2$ (FIG. 6).

In procedure 326 the total moment arm about at least one axis of the aerospace vehicle is determined from the individual moments of force. With reference to FIGS. 1 and 6, processor 104 (FIG. 1) determines the total moment arm (balance) of aerospace vehicle 130 (FIG. 6) about a longitudinal axis (extending nose to tail of the aerospace vehicle) from the individual moments of force.

Figure 8D:
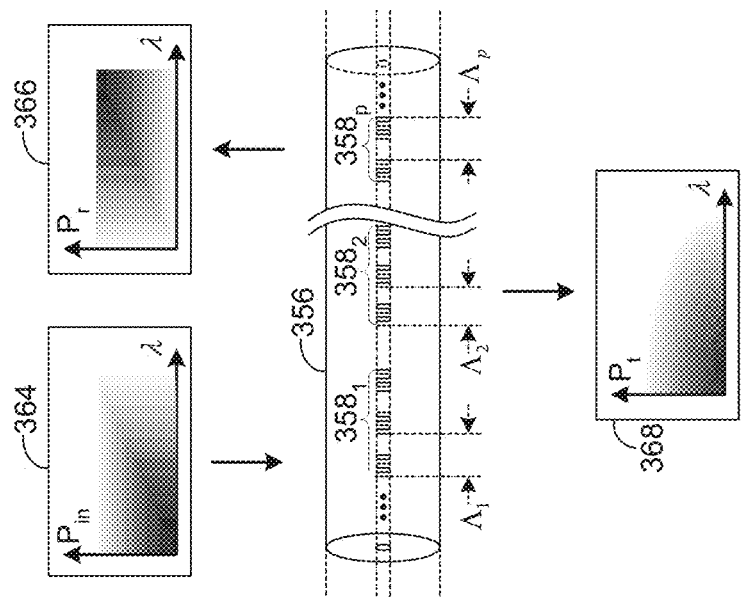
FIG. 8D is schematic illustration showing a particular aspect in the operating principles of the strain measurement subsystem of FIG. 8A.
Figure 8B:
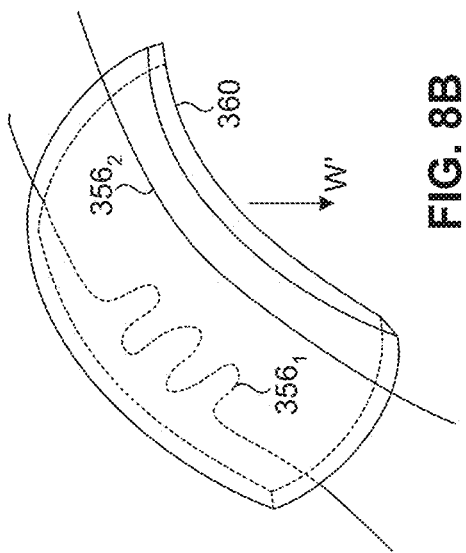
FIG. 8B is a schematic illustration showing an example embedment of FBG optical fibers to a structural part of a fuselage section or wing section of the aerospace vehicle, which is subject to deformation.
Figure 8C:
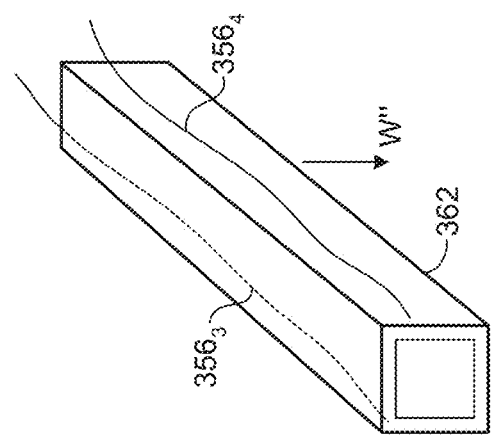
FIG. 8C is a schematic illustration showing another example embedment of FBG optical fibers to another structural part of a fuselage section or wing section of the aerospace vehicle, which is subject to deformation.
Figure 8A:
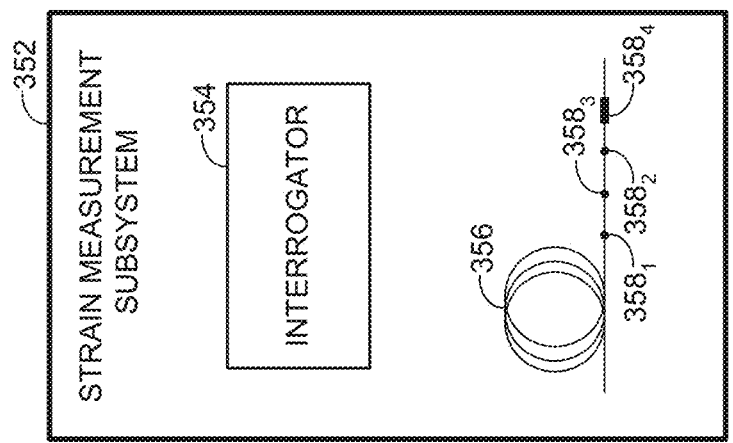
FIG. 8A is a schematic illustration of a fiber-optic strain measurement subsystem, constructed and operative according to another embodiment of the disclosed technique.

According to another (particular) embodiment of the disclosed technique, the measurement subsystem employs electro-optical strain measurement techniques. Example techniques include Brillouin scattering sensing techniques (e.g., using Brillouin distributed fiber sensors), Rayleigh scattering sensing techniques, interferometric sensing techniques (e.g., using Mach-Zehnder interferometric optical fiber sensors, Fabry-Perot interferometer (EFPI) sensing techniques), Bragg grating sensing techniques (e.g., using fiber Bragg grating (FBG) sensors), Raman scattering techniques, photoelasticity techniques, and the like. Without loss of generality, the FBG sensing technique will be selected for explicating the particulars of the present embodiment of the disclosed technique. Accordingly, the measurement subsystem employs at least one fiber-optic strain sensor. Specifically, the measurement subsystem employs at least one FBG fiber-optic strain sensor. An FBG is essentially an optical Bragg grating inscribed in the core of an optical fiber so to have a periodic variation in the refractive index, thereby reflecting particular wavelengths of light (e.g., visible, infrared) (fulfilling the Bragg condition), while transmitting other wavelengths. When an input light beam is directed to an FBG, there is a shift in the reflected wavelength (with respect to the input light beam) that is dependent upon the applied strain along the optical fiber, as well as changes to its temperature. To further elucidate this embodiment of the disclosed technique, reference is made to FIGS. 8A, 8B, 8C, and 8D. FIG. 8A is a schematic illustration of a fiber-optic strain measurement subsystem, constructed and operative according to another embodiment of the disclosed technique. FIG. 8B is a schematic illustration showing an example embedment of FBG optical fibers to a structural part of a fuselage section or wing section of the aerospace vehicle, which is subject to deformation. FIG. 8C is a schematic illustration showing another example embedment of FBG optical fibers to another structural part of a fuselage section or wing section of the aerospace vehicle, which is subject to deformation. FIG. 8D is schematic illustration showing a particular aspect in the operating principles of the strain measurement subsystem of FIG. 8A.

FIG. 8A illustrates a fiber-optic strain measurement subsystem 352, which is a particular implementation of strain measurement subsystem 102 (FIG. 1) of weight and balance estimation system 100. Fiber-optic strain measurement subsystem 302 (also denoted interchangeably for brevity "strain measurement subsystem 352") includes an interrogator 354, and an optical fiber 356, which in turn includes a plurality of Bragg gratings $358_1$, $358_2$, $358_3$, $358_4$, etc., which are configured and operative as a plurality of strain measuring points (or intervals, segments). Optical fiber 356 is coupled with interrogator 354. Alternatively, there are a plurality of optical fibers (not shown) coupled with interrogator 354. In such an alternative implementation, each optical fiber is configured and operative to measure strain and/or temperature along a plurality of measuring points (or intervals) along at least part of its length. Different optical fibers may be used to measure strain at different strain measurement areas of the aerospace vehicle.

With reference to FIGS. 8A and 8B, optical fiber 356 is embedded (coupled) into or onto a structural part 360 (FIG. 8B), such as support plate or surface in a section of fuselage (e.g., 132, FIG. 2), and/or in a section of wing (e.g., $134_1$, $134_2$) and/or in an interface that interfaces at least one of fuselage section and wing section with an undercarriage that exhibits strain or deformation (change in geometry) due to the weight (e.g., weight vector W') of the aerospace vehicle (e.g., 130—FIG. 2, 160—FIG. 3A, 180—FIG. 3C), such that at least part of the strain is correspondingly transmitted to at least part of optical fiber 356. Specifically, embedment of optical fiber 356 is achieved by incorporating it into structural part 360 during its manufacturing (or via retrofitting), as indicated by partially embedded optical-fiber 356$_1$. In addition or alternatively, embedment of optical fiber 356 is achieved by coupling it onto a part of the surface of structural part 360, as indicated by partially embedded optical-fiber 356$_2$.

Analogously, with reference to FIGS. 8A and 8C, optical fiber 356 is embedded (coupled) into or onto a structural part 362 (FIG. 8C), such as a support beam or rod in a section of fuselage, and/or in a section of a wing that exhibits strain or deformation due to the weight (e.g., weight vector W'') of the aerospace vehicle, such that at least part of the strain is correspondingly transmitted to at least part of optical fiber 356. Structural part 362 can be at least one element that couples the undercarriage of the aerospace vehicle with at least one of a fuselage section and wing section (that would experience measureable deformation due to the weight of aerospace vehicle while grounded). Optical fiber 356 is embedded by incorporating it into structural part 362 during manufacturing or retrofitting, as indicated by partially embedded optical-fiber 356$_3$. In addition or alternatively, embedment of optical fiber 356 is achieved by coupling it onto at least one part or side(s) on the surface of structural part 362, as indicated by partially embedded optical-fiber 356$_4$. It should be understood that the coupling methods of optical fiber 356 with at least one structural member of aerospace vehicle heretofore described are only examples given for elucidating the disclosed technique. In accordance with the principles of the disclosed technique, optical fiber 356 may be effectively coupled to any part of the fuselage section and/or wing section that experiences (measurable) strain (e.g., micro-strain) predominately as a result of the weight of the aerospace vehicle when on the ground.

With reference to FIGS. 8A and 8D, interrogator 354 is configured and operative to direct an input light beam ("an input optical light signal") having a particular input spectrum 364 (relating the power or intensity of the light beam as a function of wavelength—spectral density) to optical fiber 356, and detect reflected light having a particular reflected spectrum 366 (reflections from at least part of Bragg grating segments 358$_1$, 358$_2$, 358$_3$, 358$_4$, . . . , 358$_p$, where p is a positive integer). Each Bragg grating 358$_1$, 358$_2$, . . . , 358$_p$ has its respective grating period $\Lambda_1$, $\Lambda_2$, . . . , $\Lambda_p$ (each can have different Bragg wavelengths (i.e., each dependent upon the grating period and the effective refractive index of the grating)). A Bragg grating functions as an individual (strain or temperature) sensor. The input light beam may be from a broadband light source having known spectral characteristics. The detection of the reflected light may be achieved by an optical light sensor (charge-coupled device (CCD), complementary metal-oxide semiconductor (CMOS)), and further facilitated optionally by a dispersion element. Interrogator 354 is further configured and operative to detect at least one shift or change $\Delta\lambda$ in a reflected wavelength with respect to its corresponding reference (source) wavelength $\lambda_0$. Similarly to equation (2), a unit change in wavelength from the reference wavelength is given by:

$$\left(\frac{\Delta\lambda}{\lambda_0}\right)_F = C_1 \cdot \varepsilon + C_2 \cdot \Delta T, \quad (4)$$

where $\varepsilon$ is the mechanical strain, $\Delta T$ is the change in temperature, $C_1$ and $C_2$ are constants determined in the calibration method according to the disclosed technique. Particularly $C_1$ is a strain-optic constant, and $C_2 = \alpha_A + \alpha_n$ (where $\alpha_A$ is the thermal expansion coefficient and $\alpha_n$ is the thermo-optic coefficient of optical fiber 356). Equation (4) relates to a free (subscript "F"—or non-embedded) optical fiber. Embedded optical fibers 356$_1$, 356$_2$, 356$_3$, 356$_4$ that are coupled with an object or specimen (e.g., 360, 362) whose strain is measured (i.e., fuselage section, wing section) are influenced by thermal strain (i.e., temperature-effects-induced thermal strain). Equation (4) for embedded (subscript "E") optical fibers can be expressed as:

$$\left(\frac{\Delta\lambda}{\lambda_0}\right)_E = \left(\frac{\Delta\lambda}{\lambda_0}\right)_F + (\alpha_O - \alpha_A) \cdot \Delta T, \quad (5)$$

where $\alpha_O$ is the thermal expansion coefficient of the object whose strain is measured.

The disclosed technique takes into account the effect of temperature on strain measurements and may utilize temperature compensation methods as shown, for example in FIGS. 4A-4C. In particular, according to the temperature compensated method shown in FIG. 4A, each sensor is thermally coupled with a respective temperature sensor, which in turn is configured and operative to sense the temperature of its respective strain sensor thermally coupled thereto. By applying the principles of temperature compensation to the embodiment shown described in conjunction with FIGS. 8A-D, strain measurement subsystem 352 includes a temperature sensor (not shown) thermally coupled with optical fiber 356. One implementation of such a technique includes a plurality of temperature sensors (not shown) thermally coupled with and in the vicinity of at least part of Bragg gratings 308$_1$, 358$_2$, . . . , 358$_p$. The temperature sensors sense the temperature of at least part of the Bragg gratings and provide the respective temperature readings to processor 104 (FIG. 1), which in turn applies a temperature compensation model (e.g., based on equation (5)).

By applying the principles of temperature compensation described in conjunction with FIG. 4B to the embodiment shown in FIGS. 8A-D, optical fiber 356 may include miniature temperature sensors (not shown) embedded into the cladding of optical fiber so as to sense the temperature in the vicinity of at least part Bragg gratings 358$_1$, 358$_2$, . . . , 358$_p$. Processor 104 (FIG. 1) receives the individual temperature readings from the miniature temperature sensor and compensates for temperature variation effects of the individual strain measurements (e.g., according to a temperature compensation model based on equation (5)). Alternatively, at least part of the Bragg gratings is configured and operative as temperature sensors (not subject to strain). In other words, one part of the Bragg gratings of optical fiber 356 function as strain sensors, whilst the other part of the Bragg gratings function as temperature sensors (i.e., temperature measurement points that are not subjected to strain).

By applying the principles of temperature compensation described in conjunction with FIG. 4C to the embodiment described in conjunction with FIGS. 8A-D, according to one implementation, there is provided a complementary (identical auxiliary) optical fiber (not shown), coupled with interrogator 354, and thermally coupled with and extending lengthwise to optical fiber 356, such that the complementary optical fiber is mechanically configured not to exhibit strain-induced effects (e.g., rigidly set or fixed), due to the weight of aerospace vehicle, thus functioning essentially as a temperature sensor. Interrogator 354 detecting a shift Δλ in a reflected wavelength of light through the auxiliary optical fiber would only depend on temperature. According to another implementation, both optical fiber 356 and complementary optical fiber are capable of exhibiting strain-induced effects of the measured object, whereas one optical fiber (e.g., the complementary) is enclosed in a thermally isolated (temperature controlled) flexible pipe (not shown) such that its temperature is maintained constant.

According to another compensation method for temperature variation effects on strain measurements, the material of object to which optical fiber 356 is coupled with is chosen to have a thermal expansion coefficient ($\alpha_o$) that is substantially the same as the thermal expansion coefficient an of optical fiber 356. In such a case the expression in equation (5): ($\alpha_o - \alpha_A$)·ΔT vanishes.

According to a further compensation method for temperature variation effects on strain measurements, there are two optical FBG fibers 356 that are coupled with a specimen to be measured for strain on opposing sides (e.g., a structural member of aerospace vehicle), such that the strain measurements acquired from each of the two optical FBG fibers are phase shifted complementarily to each other (e.g., 180°, and e.g., by a factor related to the geometry (e.g., curvature)). Assuming that the two optical FBG fibers are influenced by temperature substantially concurrently and in the same manner, processor 104 may determine and remove or filter out the temperature effect on the strain measurement.

There are various configurations of strain measurement subsystem 352. According to one configuration, strain measurement subsystem 352 in its entirety (including interrogator 354 and optical fiber 356) is incorporated (built-in) into aerospace vehicle 130 ("fully onboard" configuration). According to another configuration, strain measurement subsystem 352 is partially incorporated into aerospace vehicle 130 ("partial onboard" configuration) such that integrator 354 is off-board (deployed by a ground personnel whenever weight and balance estimation of aerospace is required) and optical fiber 356 is onboard (coupled with a fuselage section and/or wing section). According to a further configuration, strain measurement subsystem 352 is not typically incorporated into aerospace vehicle 130 but retrofitted when required ("full off-board" configuration).

Alternatively, fiber-optic strain measurement subsystem 352 employs Brillouin sensing techniques. Brillouin distribution fiber sensing techniques involve detecting and measuring a measurable physical property (measurand) such as strain and temperature along an optical fiber that functions as a distributed sensor (transducer) as well as an optical (data) channel (e.g., optical fiber 356). The principles of Brillouin scattering of light within an optical fiber is employed to measure a Brillouin frequency shift as a function of strain (typically micro-strain (με)) and/or as a function of temperature. Since both strain and temperature effects may occur simultaneously, there are techniques to separate their commingled effect (e.g., analogously to the temperature compensation methods heretofore described), which may involve, for example the determination of the Rayleigh to Brillouin backscattered light intensity ratio, which is dependent only on temperature. The Brillouin scattering sensing method typically involves the use of a Brillouin optical time domain reflectometer (BOTDR) (not shown), an apparatus that combines the principles of Briollouin scattering and optical time domain reflectometry (OTDR).

Further alternatively and analogously, strain measurement subsystem 352 employs other techniques or a combination of techniques, which include, for example, Rayleigh scattering techniques, Raman scattering techniques, interferometric sensing techniques (e.g., Mach-Zehnder interferometric technique), photoelasticity techniques for measuring stresses (e.g., via isochromatic fringes), and the like.

The strain measuring and determining techniques presented in the foregoing embodiments were described by way of example, for the purposes of elucidating the disclosed technique. Without loss of generality, the principles of the disclosed technique likewise apply to and are compatible with different types of strain determining and measuring methods and devices, which include for example, resistive/conductive conductor (e.g., foil) methods and devices, capacitive methods and devices, inductive methods and devices, piezo-resistive methods and devices, semiconductor methods and devices, fiber optic methods and devices, microelectromechanical system (MEMS) methods and devices, micro-opto-electro-mechanical systems (MOEMS) methods and devices, photoelasticity methods and techniques (e.g., employing a camera as a strain measurement device that detects strain in at least a partially transparent portion of fuselage section and/or wing section subject to deformation due at least partially to the weight of aerospace vehicle), and the like.

According to another aspect of the disclosed technique, weight and balance estimation system 100 allows for estimating the weight (or mass) of the aerospace vehicle during flight (i.e., in-flight weight), provided that weight estimation was performed on the ground prior to takeoff. Prior to takeoff, weight and balance estimation system 100 estimates the aerospace vehicle's weight (e.g., the gross weight, which is the total weight including payload (e.g., crew, passengers, etc.), cargo (e.g., luggage, etc.), fuel, oil, etc.). During operation (e.g., flight, taxiing, etc.), the weight of the aerospace vehicle progressively decreases, as a result of fuel and oil consumption. Given a known amount of initial mass consumables (fuel, oil, etc.) before takeoff (e.g., at the time of weight estimation) and knowledge of a current amount of mass consumables (e.g., fuel amount or level) during flight, weight and balance estimation system 100 is configured and operative to estimate a current in-flight weight (or mass) value of the aerospace vehicle. With mass consumables aside, the weight of the aerospace vehicle is dependent on its altitude, as weight decreases with altitude. Weight and balance estimation system 100 takes into account the aerospace vehicle's altitude in the in-flight weight estimate by receiving current altitude data from the aerospace vehicle's flight management system (FMS) via communication subsystem 108 (FIG. 1).

Weight and balance estimation system 100 is configured and operative to provide (e.g., transmit via communication subsystem 108—FIG. 1), the weight estimation and balance estimations (i.e., CG(x), CG(y), CG(z)), outputted by the system to a flight computer (e.g., FMS) of aerospace vehicle 130, to the pilot(s), engineer(s), technical staff (e.g., via user interface 110—FIG. 1), ground crew of the aerospace vehicle, a ground control system (GCS) and a flight line tester (FLT) (if aerospace vehicle is a UAV), and the like. Particularly, during operation, just before takeoff of aerospace vehicle 130, weight and balance estimation system 100 is configured to output a weight and balance estimation (e.g., for use by a pilot, engineer, ground crew, etc.). Specifically, aerospace vehicle 130 may include sensors (not shown) configured to sense whether the outer doors, maintenance bays, receptacles, etc. of aerospace vehicle 130 are in a locked configuration (e.g., and that the aircraft maintains pressurization) and to generate corresponding signals. Processor 104 is configured to receive the signals from the sensors and to perform weight and balance estimation based on whether aerospace vehicle 130 is in a locked configuration, as it is advantageous to know the correct weight and balance of aerospace vehicle 130 prior to takeoff.

Figure 9:
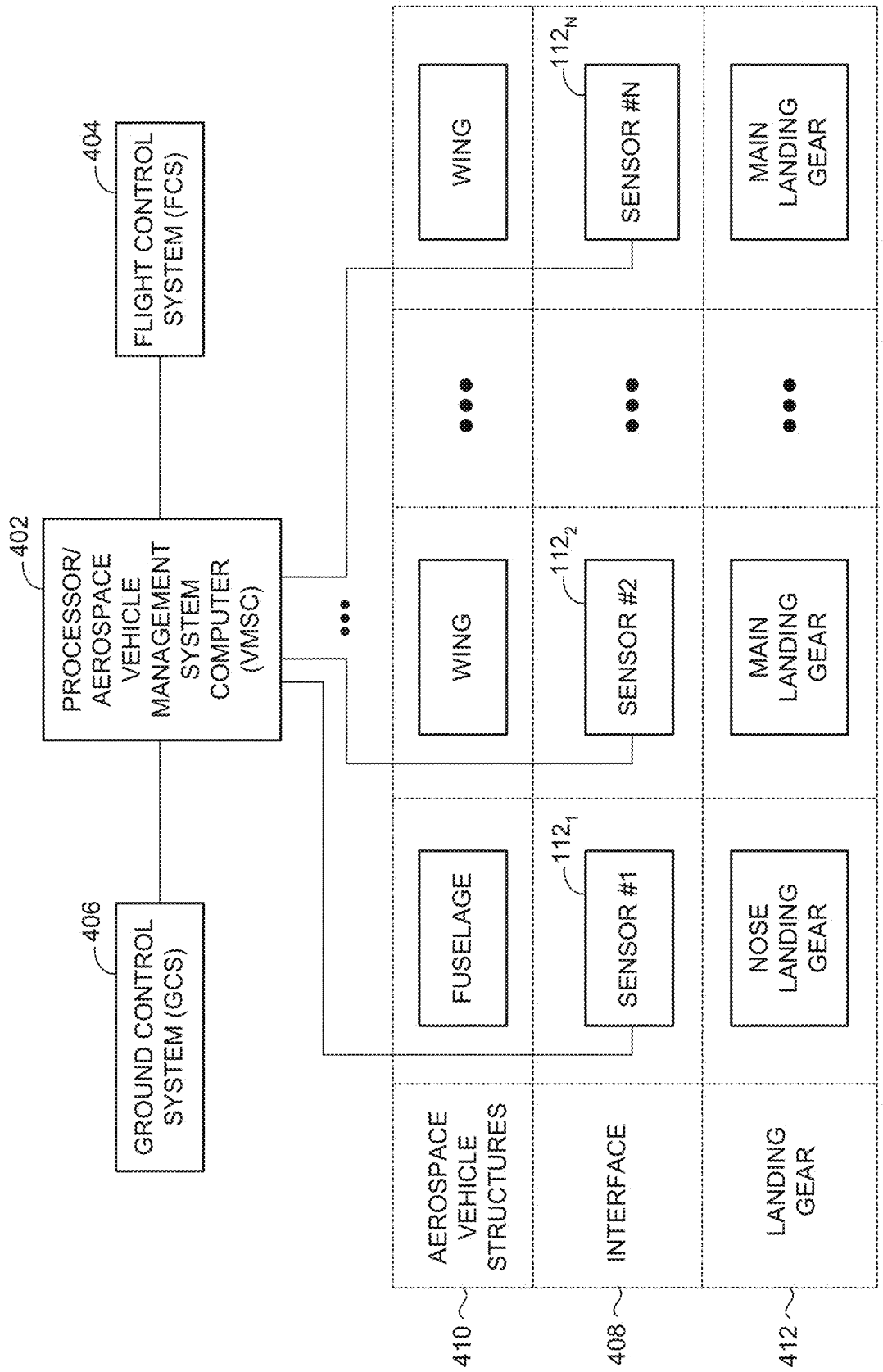
FIG. 9 is a schematic illustration showing an implementation of the weight and balance estimation system for determining a flight-ground status of the aerospace vehicle.

Weight and balance estimation system 100 is further configured and operative to provide indication to a flight-ground status of aerospace vehicle 130. The flight-ground status is defined herein as an indication of whether aerospace vehicle 130 is grounded, in flight (e.g., airborne), as well as in intermediate states between grounded and in flight (and vice-versa) especially during takeoff and landing of aerospace vehicle 130. To further elucidate the particulars of this aspect of the disclosed technique, reference is now further made to FIG. 9, which is a schematic illustration showing an implementation of the weight and balance estimation system for determining a flight-ground status of the aerospace vehicle. FIG. 9 illustrates a plurality of sensors $112_1$, $112_2$, ..., $112_N$ of measurement subsystem 102 (FIG. 1) coupled with a processor 402, which is identical with processor 104 (FIG. 1). Alternatively, processor 402 is embodied as an aerospace vehicle management system computer (VMSC) that is configured and operative to also perform the functions of processor 104. Processor 402 is configured and operative to be communicatively coupled with a flight control system (FCS) 404, and with a ground control system (GCS) 406 (e.g., in case aerospace vehicle 130 is an UAV, a drone, etc.).

Sensors $112_1$, $112_2$, ..., $112_N$ are associated with (e.g., coupled with, retrofitted to, integrated with, functionally engage with) an interface (e.g., interface 210 of FIG. 3E, interface 218 of FIG. 3F) and are shown at an interface layer 408 that is configured and operative to interface between an aerospace vehicle structures layer 410 (which includes the fuselage and wings of aerospace vehicle 130 (see e.g., FIG. 2)) and a landing gear layer 412 (which includes the landing gear or undercarriage of aerospace vehicle 130). In the example shown in FIG. 9, sensor $112_1$ is associated with an interface that interfaces between a fuselage section and a nose landing gear (e.g., $136_1$, FIG. 2), and sensors $112_2$, $112_N$ are each associated with a respective interface that interfaces between a respective wing section and a respective main landing gear (e.g., $136_4$, $136_5$, FIG. 2).

Weight and balance estimation system 100, and particularly processor 402, are configured and operative to determine the flight-ground status of aerospace vehicle 130 according to the outputs received from sensors $112_1$, $112_2$, ..., $112_N$. The flight-ground status can be divided into at least the following example cases or states. In the grounded state, weight and balance estimation system 100 determines the weight and balance of aerospace vehicle 130 as described hereinabove. During flight (i.e., through air, in space, etc.) the undercarriage does not experience the weight of aerospace vehicle 130 as when it is grounded. Consequently, the sensors of the interfaces generate measurements corresponding to this state. Processor 402 receives these measurements and is configured and operative to determine that aerospace vehicle 130 is in flight.

In the intermediate states of dynamic transition between flight and grounded states such as takeoff, landing, and launch states, the undercarriage experiences varying load conditions. During takeoff, aerospace vehicle 130 disengages from the ground as lift gradually overcomes the weight of aerospace vehicle 130. Sensors $112_1$, $112_2$, ... $112_N$ of the interfaces are configured and operative to continuously (or intermittently) generate outputs during takeoff, which in turn are processed by processor 402 to determine a takeoff weight profile (i.e., data representing the decreasing weight experienced by the undercarriage during takeoff and until disengagement from the ground). The takeoff weight profile includes information pertaining to weight as a function of time including the time of disengagement from ground. Likewise, processor 402 is configured and operative to determine a launch weight profile.

Conversely, during landing, aerospace vehicle 130 engages (makes contact or "touches down") with the ground as its lift gradually decreases. The term "ground" is derived from the defined term "grounded" hereinabove (as it can also relate for example to the case of landing on a maritime vessel such as an aircraft carrier at sea, a helipad on a building, etc.). Sensors $112_1$, $112_2$, ... $112_N$ of the interfaces are configured and operative to continuously (or intermittently) generate outputs during landing, which in turn are processed by processor 402 to determine a landing weight profile (i.e., data representing the increasing weight experienced by the undercarriage during landing until the state of being fully grounded). The landing weight profile includes information pertaining to weight as a function of time including the time of contact with the ground, such that processor 404 is configured and operative to further determine the force of impact, and various conditions such as heavy landing, hard landing, soft landing, dead-stick landing, asymmetric landing, and the like. For example, a hard landing involving a high velocity impact (high deceleration) may adversely affect the landing gear or other structural parts (e.g., the fuselage, wings, etc.). The landing weight profile may be used to evaluate as well as to provide an indication to the airworthiness or flightworthiness or aerospaceworthiness of aerospace vehicle 130 including for the purposes of maintenance, flight control, statistical analysis, and health monitoring of the aerospace vehicle's structures. Processor 402 is further configured and operative to communicate the flight-ground status including the takeoff and landing weight profiles to FCS 404 and GCS 406.

In addition, weight and balance estimation system 100 is used to augment the functionality as well as measurements acquired by sensors already present in aerospace vehicle 130 (which are conveyed to FCS 404), such as a weight-on-wheels (WOW) sensor (not shown), a distance from the ground determination sensor (not shown), and measurements that include the aerospace vehicle's speed, pitch, lift data, INS data, and the like.

It will be appreciated by persons skilled in the art that the disclosed technique is not limited to what has been particularly shown and described hereinabove. Rather the scope of the disclosed technique is defined only by the claims, which follow.

The invention claimed is:

1. A weight estimation system for estimating weight of an aerospace vehicle while grounded, the weight estimation system comprising:
   a measurement subsystem including at least one sensor configured to measure a physical property in an interface that interfaces between at least one of a fuselage and a wing with an undercarriage of said aerospace vehicle, in at least one area exhibiting a measurable change in geometry that is at least partly due to said weight, said interface is a coupling between said undercarriage and at least one of said fuselage and said wing, said measurement subsystem configured to produce measured data indicative of said weight of said aerospace vehicle; and a processor for receiving at least part of said measured data, said processor configured to estimate said weight, by relating said measured data with predetermined physical-property-to-weight correspondence data associated with said aerospace vehicle.

2. The weight estimation system according to claim 1, wherein said at least one sensor is further configured to measure said physical property in at least one of said fuselage and said wing, wherein said at least one area of said fuselage and said wing is adjacent to said undercarriage of said aerospace vehicle.

3. The weight estimation system according to claim 2, wherein said sensor is at least one of: coupled with, incorporated, and embedded into a section at least one of said fuselage, said wing, and said interface of said aerospace vehicle.

4. The weight estimation system according to claim 2, further comprising at least one temperature sensor configured to at least one of:
measure temperature of at least one of said fuselage in a vicinity of said sensor, said wing in a vicinity of said sensor, and said sensor; and
produce respective temperature data, wherein said at least one of said processor and said measurement subsystem is configured to at least partially compensate for temperature-induced strain effects of at least one of said fuselage, said wing, said interface, and said sensor, when said physical property is strain.

5. The weight estimation system according to claim 1, wherein said measurement subsystem is configured to produce measured data from at least two sensors, such that said at least two sensors, having known sensor positions, are configured to said measure said physical property in at least two different said at least one area, about at least one axis of said aerospace vehicle, said processor is configured to determine a center of gravity (CG) of said aerospace vehicle about said at least one axis based on said measured data associated with said at least two sensors, and said sensor positions, and attitude data corresponding to the attitude of said aerospace vehicle, wherein said at least one axis includes at least one of a longitudinal axis of said aerospace vehicle, and a lateral axis of said aerospace vehicle.

6. The weight estimation system according to claim 5, wherein said processor is configured to:
receive said measured data that is performed at two different attitudes of said aerospace vehicle, corresponding to two different attitude values, and
determine further said CG about a vertical axis of said aerospace vehicle based on said attitude values.

7. The weight estimation system according to claim 1, wherein said measurement system includes an interrogator, and said measurement system employs an electro-optical strain measurement technique selected from a list consisting of:
a fiber Bragg grating (FBG) sensing technique;
a Brillouin scattering sensing technique;
a Rayleigh scattering sensing technique;
a Raman scattering sensing technique;
an interferometric sensing technique; and
a photoelasticity technique.

8. The weight estimation system according to claim 7, wherein said FBG sensing technique includes at least one FBG sensor that includes at least one strain measuring point, said FBG sensor is at least one of: embedded into, retrofitted on, coupled with, and incorporated during manufacturing of, at least a part of said aerospace vehicle.

9. The weight estimation system according to claim 1, wherein said weight estimation system is configured to provide an indication to a flight-ground status of said aerospace vehicle that is selected from a list consisting of:
a grounded state;
an in-flight state;
a takeoff state;
a landing state; and
a launch state.

10. The weight estimation system according to claim 9, wherein said processor is further configured to determine, during landing of said aerospace vehicle, at least one of a force of impact, a heavy landing, a hard landing, a soft landing, a dead-stick landing, and an asymmetrical landing.

11. A method for estimating weight of an aerospace vehicle while grounded, the method comprising the procedures of:
measuring a physical property in an interface that interfaces between at least one of a fuselage and a wing with an undercarriage of said aerospace vehicle, in at least one area exhibiting a measurable change in geometry that is at least partly due to said weight, said interface is a coupling between said undercarriage and at least one of said fuselage and said wing;
producing measured data indicative of said weight of said aerospace vehicle, according to measured said physical property; and
estimating said weight by relating said measured data with predetermined physical-property-to-weight correspondence data associated with said aerospace vehicle.

12. The method according to claim 11, wherein said procedure of measuring is in at least one of said fuselage and said wing.

13. The method according to claim 12, further comprising a procedure of measuring temperature of at least one of said fuselage, said wing, and said interface, and producing respective temperature data.

14. The method according to claim 13, further comprising:
determining an effect of thermal strain on measured said physical property being strain; and
determining mechanical strain that excludes said effect of thermal strain on measured said physical property being strain.

15. The method according to claim 14, further comprising a procedure of determining said predetermined physical-property-to-weight correspondence data, based on determined said effect of thermal strain, and said mechanical strain, when said physical property is strain.

16. The method according to claim 13, further comprising a procedure of at least partially compensating for temperature-induced strain effects of at least one of said fuselage, said wing, said interface, and a sensor measuring said physical property, when said physical property is strain, according to said temperature data.

17. The method according to claim 11, further comprising a procedure of weighing said aerospace vehicle on an external weight calibration system, so as to produce calibration weight data, wherein said aerospace vehicle is in an environment having a known temperature.

18. The method according to claim 11, further comprising:
receiving attitude data corresponding to attitude of said aerospace vehicle;

measuring said physical property from at least two known positions, and about at least one axis of said aerospace vehicle;

producing corresponding said measured data from said at least two known positions; and determining a center of gravity (CG) of said aerospace vehicle about said at least one axis based on said measured data associated with said at least two positions, said known positions, and said attitude data;

wherein said at least one axis includes at least one of a longitudinal axis of said aerospace vehicle, and a lateral axis of said aerospace vehicle.

19. The method according to claim 18, further comprising the procedures of:

receiving said measured data that is performed at two different attitudes of said aerospace vehicle, corresponding to two different attitude values; and determining further said CG about a vertical axis of said aerospace vehicle based on said attitude values.

20. A sensor system for an aerospace vehicle, the sensor system comprising:

at least one sensor coupled with an interface that interfaces between at least one of a fuselage and a wing with an undercarriage of said aerospace vehicle, said interface is a coupling between said undercarriage and at least one of said fuselage and said wing, said at least one sensor configured to measure a physical property in at least one of said fuselage, said wing, and said interface in at least one area exhibiting a measurable change in geometry that is at least partly due to weight of said aerospace vehicle while grounded, said at least one sensor configured to produce measured data indicative of said weight of said aerospace vehicle.

21. The sensor system according to claim 20, further comprising a processor for receiving at least part of said measured data, said processor configured to estimate said weight, by relating said measured data with predetermined physical-property-to-weight correspondence data associated with said aerospace vehicle.

* * * * *